US 11,509,895 B2

(12) United States Patent
Kim et al.

(10) Patent No.: US 11,509,895 B2
(45) Date of Patent: Nov. 22, 2022

(54) IMAGE ENCODING/DECODING METHOD USING PIXEL VALUE RANGE CONSTITUTING IMAGE

(71) Applicant: Industry-University Cooperation Foundation Hanyang University, Seoul (KR)

(72) Inventors: Ki Baek Kim, Seoul (KR); Je Chang Jeong, Seoul (KR)

(73) Assignee: Industry-University Cooperation Foundation Hanyang University, Seoul (KR)

(*) Notice: Subject to any disclaimer, the term of this patent is extended or adjusted under 35 U.S.C. 154(b) by 0 days.

(21) Appl. No.: 17/199,741

(22) Filed: Mar. 12, 2021

(65) Prior Publication Data

US 2021/0203935 A1  Jul. 1, 2021

Related U.S. Application Data

(63) Continuation of application No. 16/496,239, filed as application No. PCT/KR2018/003350 on Mar. 22, 2018, now abandoned.

(30) Foreign Application Priority Data

Mar. 22, 2017  (KR) ........................ 10-2017-0036369

(51) Int. Cl.
*H04N 19/122* (2014.01)
*H04N 19/14* (2014.01)
(Continued)

(52) U.S. Cl.
CPC ........... *H04N 19/122* (2014.11); *H04N 19/14* (2014.11); *H04N 19/172* (2014.11);
(Continued)

(58) Field of Classification Search
CPC .... H04N 19/122; H04N 19/14; H04N 19/172; H04N 19/174; H04N 19/176; H04N 19/184
(Continued)

(56) References Cited

U.S. PATENT DOCUMENTS 7,158,669 B2   1/2007  Tanaka et al.
9,100,661 B2   8/2015  Alshina et al.
(Continued)

FOREIGN PATENT DOCUMENTS

JP   2004-229261 A    8/2004
KR   10-2013-0064781 A   6/2013
(Continued)

OTHER PUBLICATIONS

International Search Report for PCT/KR2018/003350, dated Jul. 6, 2018.
(Continued)

*Primary Examiner* — Joseph G Ustaris
*Assistant Examiner* — Jimmy S Lee
(74) *Attorney, Agent, or Firm* — Sughrue Mion, PLLC

(57) ABSTRACT

An image encoding/decoding method using a pixel value range constituting an image is disclosed, wherein the image decoding method using a pixel value range constituting an image comprises the steps of: receiving a bitstream; acquiring information of a pixel value range forming a first unit image included in the received bitstream; and decoding the first unit image on the basis of the acquired information of the pixel value range. Therefore, compression efficiency can be improved in an image encoding or decoding process.

6 Claims, 13 Drawing Sheets

(51) Int. Cl.
*H04N 19/172* (2014.01)
*H04N 19/174* (2014.01)
*H04N 19/176* (2014.01)
*H04N 19/184* (2014.01)

(52) U.S. Cl.
CPC ......... *H04N 19/174* (2014.11); *H04N 19/176* (2014.11); *H04N 19/184* (2014.11)

(58) Field of Classification Search
USPC .................................................. 375/240.02
See application file for complete search history.

(56) References Cited

U.S. PATENT DOCUMENTS

| | | | |
|---|---|---|---|
| 9,521,434 B2 | 12/2016 | Chen et al. | |
| 2003/0160100 A1 | 8/2003 | Ito et al. | |
| 2003/0198381 A1 | 10/2003 | Tanaka et al. | |
| 2009/0135909 A1* | 5/2009 | Chen | H04N 19/55 375/E7.123 |
| 2011/0142134 A1* | 6/2011 | Wahadaniah | H04N 19/176 375/E7.125 |
| 2011/0243232 A1 | 10/2011 | Alshina et al. | |
| 2011/0280302 A1 | 11/2011 | Alshina et al. | |
| 2012/0314026 A1 | 12/2012 | Chen et al. | |
| 2013/0170763 A1 | 7/2013 | Shimizu et al. | |
| 2013/0279577 A1* | 10/2013 | Schwarz | H04N 19/172 375/240.12 |
| 2015/0264354 A1 | 9/2015 | Zhang et al. | |
| 2015/0264364 A1 | 9/2015 | Zhang et al. | |
| 2016/0301941 A1 | 10/2016 | Chono et al. | |
| 2018/0131964 A1 | 5/2018 | Min et al. | |
| 2018/0359494 A1* | 12/2018 | Hsu | H04N 19/96 |

FOREIGN PATENT DOCUMENTS

| | | |
|---|---|---|
| KR | 10-2015-0133825 A | 11/2015 |
| KR | 10-2016-0086978 A | 7/2016 |
| KR | 10-2016-0132869 A | 11/2016 |
| KR | 10-1710623 B1 | 3/2017 |
| WO | 2016/182266 A1 | 11/2016 |

OTHER PUBLICATIONS

Office Action issued in parent U.S. Appl. No. 16/496,239 dated Jul. 10, 2020.
Communication dated Feb. 7, 2022, issued by the Korean Intellectual Property Office in application No. 10-2019-7027157.

* cited by examiner

```
Sample range information( )
{
        sps_adaptive_sample_range if(sps_adaptive_sample_range)
                pps_adaptive_sample_range if(pps_adaptive_sample_range)
                adaptive_sample_range_flag if(adaptive_sample_range_flag)
        {
                luma_lower_bound
                luma_upper_bound
                for ( i=0; i<2; i++)
                {
                        chroma_lower_bound[i]
                        chroma_lower_bound[i]
                }
        }
}
```

FIG. 6

IMAGE ENCODING/DECODING METHOD USING PIXEL VALUE RANGE CONSTITUTING IMAGE

TECHNICAL FIELD

This is a continuation of U.S. application Ser. No. 16/496,239 filed on Sep. 20, 2019, in which the invention relates to an encoding/decoding method using a pixel value range constituting an image. More particularly, the present invention relates to encoding and decoding methods using a pixel value range constituting an actual image rather than a bit depth considering a fact that images have different pixel value ranges.

BACKGROUND ART

The organizations called ISO/ISE MPEG (Moving Picture Experts Group) and ITU-T VCEG (Video Coding Experts Group) have organized the Joint Collaborative Team on Video Coding (JCT-VC), and JCT-VC created video coding standard technology that is ISO/IEC MPEG-H HEVC (High Efficiency Video Coding)/ITU-T H.265. In addition, in order to satisfy the trend where high-definition videos have become popular by current rapid developments of information and communication technology, ISO/ISE MPEG and ITU-T VCEG have organized JVET (Joint Video Exploration Team) at the 22nd JCT-VC Geneva Conference, and the JVET is actively working to establish a next-generation image coding technology standard for image coding for UHD (ultra-high definition) images which provides clearer quality than HD (high definition) images.

In the meantime, according to existing video compression standard technology, a pixel value range is determined according to a preset bit depth, and a pixel value beyond the determined pixel value range is adjusted through clipping, thereby performing image compression according to a bit depth.

However, a pixel value range constituting an actual image is different from a pixel value range determined according to a bit depth, and thus an image encoding/decoding method suitable for an actual image is required.

DISCLOSURE

Technical Problem

The present invention has been made to solve the above problem, and an object of the present invention is intended to propose an image encoding method using a pixel value range constituting an image.

To solve the above problem, another object of the present invention is intended to propose an image decoding method using a pixel value range constituting an image.

To solve the above problem, still another object of the present invention is intended to propose an image encoding method using two or more bit depths.

Technical Solution

In order to achieve the above objects, according to one aspect of the present invention, there is provided an image encoding method using a pixel value range constituting an image.

Herein, the image encoding method using the pixel value range constituting the image may include: obtaining an input image to be encoded; obtaining a pixel value range constituting a first unit image included in the obtained input image; encoding the pixel value range constituting the first unit image; and generating a bitstream including the encoded pixel value range.

Herein, the first unit image may be an image composed of a unit that is one among a picture, a slice, a tile, and a block.

Herein, the encoding may include encoding a difference value between a maximum value of pixel values constituting the first unit image and a maximum pixel value based on a bit depth.

Herein, the encoding may include generating band information indicating a band to which a maximum value or a minimum value of pixel values constituting the first unit image belongs.

Herein, after the generating of the band information, there may be further included generating band position information indicating a position within the band to which the maximum value or the minimum value of the pixel values constituting the first unit image belongs.

Herein, the generating of the band position information may be performed when a representative value for the band to which the maximum value or the minimum value belongs is not preset.

Herein, the representative value may be one among a maximum pixel value, a minimum pixel value, and a median value in the band to which the maximum value or the minimum value belongs.

Herein, the generating of the band information may include: generating the band information on the band to which any one among the maximum value and the minimum value belongs; and generating, by using the generated band information as a prediction value, the band information on the band to which the other one belongs.

Herein, the encoding may include: obtaining a pixel value range constituting a different unit image in which encoding is completed; and encoding the pixel value range constituting the first unit image, by using the pixel value range constituting the different unit image as a prediction value.

Herein, the encoding of the pixel value range constituting the first unit image may include generating syntax information indicating whether the pixel value range constituting the different unit image and the pixel value range constituting the first unit image belong to the same band.

In order to achieve the above objects, according to another aspect of the present invention, there is provided an image decoding method using a pixel value range constituting an image.

Herein, the image decoding method using the pixel value range constituting the image may include: receiving a bitstream; obtaining information on a pixel value range constituting a first unit image included in the received bitstream; and performing decoding on the first unit image on the basis of the obtained information on the pixel value range.

Herein, the first unit image may be an image composed of a unit that is one among a picture, a slice, a tile, and a block.

Herein, the obtaining of the information on the pixel value range constituting the first unit image may include: obtaining, from the bitstream, a difference value between a maximum value of pixel values constituting the first unit image and a maximum pixel value based on a bit depth; and obtaining, on the basis of the difference value, the maximum value of the pixel values constituting the first unit image.

The obtaining of the information on the pixel value range constituting the first unit image may include obtaining band information indicating a band to which a maximum value or a minimum value of pixel values constituting the first unit image belongs.

Herein, after the obtaining of the band information, there may be further included obtaining band position information indicating a position within the band to which the maximum value or the minimum value of the pixel values constituting the first unit image belongs.

Herein, the obtaining of the band position information may be performed when a representative value for the band to which the maximum value or the minimum value belongs is not preset.

Herein, the representative value may be one among a maximum pixel value, a minimum pixel value, and a median value in the band to which the maximum value or the minimum value belongs.

Herein, the obtaining of the band information may include: obtaining the band information on the band to which any one among the maximum value and the minimum value belongs; and obtaining, by using the obtained band information as a prediction value, the band information on the band to which the other one belongs.

Herein, the obtaining of the band information may include: obtaining a pixel value range constituting a different unit image in which decoding is completed; and obtaining the pixel value range constituting the first unit image, by using the pixel value range constituting the different unit image as a prediction value.

In order to achieve the above objects, according to still another aspect of the present invention, there is provided an image encoding method using two or more bit depths.

Herein, the image encoding method using the two or more bit depths may include: obtaining an input image to be encoded; performing first encoding on the obtained input image on the basis an internal bit depth; transforming the input image on which the first encoding is performed into an external bit depth; and generating a bitstream by performing second encoding on the input image transformed into the external bit depth.

Herein, the internal bit depth may have a greater value than a value of the external bit depth.

Advantageous Effects

In the case of utilizing the image encoding/decoding method using the pixel value range constituting the image according to the present invention, it is possible to perform encoding and decoding according to the characteristics of the actual image.

Also, a bit depth having a wider pixel value range is used in encoding and decoding processes so that it is possible to reduce pixel values discarded due to the pixel value adjustment.

Therefore, image encoding and decoding efficiency can be enhanced.

DESCRIPTION OF DRAWINGS

FIG. 6 is an example of source code for generating syntax information with respect to an adaptive pixel value adjustment method according to an embodiment of the present invention.

MODE FOR INVENTION

Figure 1:
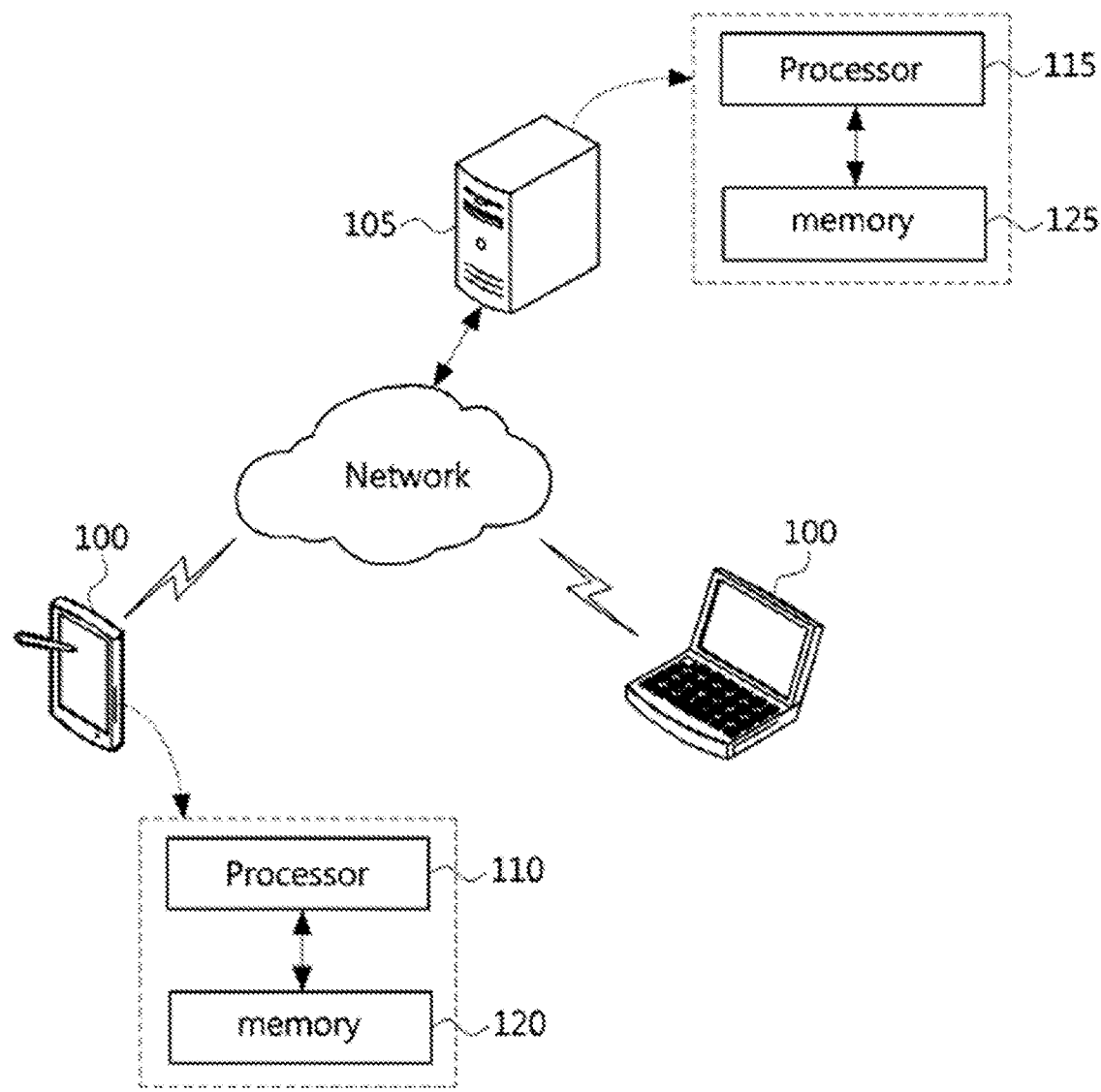
FIG. 1 is a conceptual diagram illustrating an image encoding and decoding system according to an embodiment of the present invention.

The present invention may be modified in various ways and implemented by various embodiments, so that specific embodiments are shown in the drawings and will be described in detail. However, the present invention is not limited thereto, and the exemplary embodiments can be construed as including all modifications, equivalents, or substitutes in a technical concept and a technical scope of the present invention. The similar reference numerals refer to the similar elements described in the drawings.

Terms "first", "second", "A", "B", etc. can be used to describe various elements, but the elements are not to be construed as being limited to the terms. The terms are only used to differentiate one element from other elements. For example, the "first" element may be named the "second" element without departing from the scope of the present invention, and similarly the "second" element may also be named the "first" element. The term "and/or" includes a combination of a plurality of items or any one of a plurality of terms.

It will be understood that when an element is referred to as being "coupled" or "connected" to another element, it can be directly coupled or connected to the element or intervening elements may be present therebetween. In contrast, it will be understood that when an element is referred to as being "directly coupled" or "directly connected" to another element, there are no intervening elements present.

The terms used in the present specification are merely used to describe particular embodiments, and are not intended to limit the present invention. An expression used in the singular encompasses the expression of the plural, unless it has a clearly different meaning in the context. In the present specification, it will be understood that terms such as "including", "having", etc. are intended to indicate the existence of the features, numbers, steps, actions, elements, parts, or combinations thereof disclosed in the specification, and are not intended to preclude the possibility that one or more other features, numbers, steps, actions, elements, parts, or combinations thereof may exist or may be added.

Unless otherwise defined in the specification, all terms including technical and scientific terms used herein have the same meaning as commonly understood by one of ordinary skill in the art to which the present invention belongs. It will be further understood that terms used herein should be interpreted as having a meaning that is consistent with their meaning in the context of this specification and the relevant art and will not be interpreted in an idealized or overly formal sense unless expressly so defined herein.

Typically, an image may be composed of a series of still images, and the still images may be divided into units of groups of pictures (GOPs), and each still image may be referred to as a picture or a frame. As a higher concept, there is a unit such as a GOP, a sequence, or the like. Further, each picture may be partitioned into predetermined regions, such as slices, tiles, blocks, or the like. Further, one GOP may include a unit such as an I picture, a P picture, a B picture, or the like. The I picture may refer to a picture that is encoded/decoded by itself without using a reference picture. The P picture and the B picture may refer to pictures that are encoded/decoded by performing a process, such as motion estimation, motion compensation, and the like, with use of the reference picture. In general, in the case of the P picture, the I picture and the P picture may be used as reference pictures. In the case of the B picture, the I picture and the P picture may be used as the reference pictures, but the above definitions may be changed by an encoding/decoding setting.

Herein, a picture referenced in encoding/decoding is called a reference picture, and a block or pixel referenced is called a reference block or reference pixel. Further, data that is referenced (reference data) may be a pixel value in a spatial domain as well as a coefficient value in a frequency domain and various types of encoding/decoding information generated and determined during an encoding/decoding process.

The minimum unit constituting an image may be a pixel, and the number of bits used to represent one pixel is referred to as a bit depth. In general, the bit depth may be 8 bits, and different bit depths may be supported according to the encoding setting. Regarding the bit depth, at least one bit depth may be supported according to a color space. Further, at least one color space may be included according to a color format of an image. According to the color format, one or more pictures in a fixed size or one or more pictures in different sizes may be included. For example, YCbCr 4:2:0 may be composed of one luminance component (Y in this example) and two chrominance components (Cb/Cr in this example). Herein, the composition ratio between the chrominance component and the luminance component may be 1:2 in horizontal and vertical lengths. As another example, YCbCr 4:4:4 may have the same composition ratio in horizontal and vertical lengths. In the above example, when one or more color spaces are included, the picture is partitioned into the respective color space.

In the present invention, a description will be made based on any color space (Y in this example) of any color format (YCbCr in this example), and this description will be applied to the other color spaces (Cb and Cr in this example) according to the color format in the same or similar manner (a setting dependent on a particular color space). However, it is possible that a partial difference (a setting independent of a particular color space) is given to each color space. That is, the setting dependent on each color space may refer to a setting that is proportional to or dependent on the composition ratio (for example, determined according to 4:2:0, 4:2:2, 4:4:4, or the like) of each component. The setting independent of each color space may refer to a setting only for the corresponding color space, independently from or regardless of the composition ratio of each component. In the present invention, according to an encoder/decoder, an independent setting or dependent setting may be provided with respect to some constituents.

Setting information or a syntax element required in an image encoding process may be determined at a level of a unit such as a video, a sequence, a picture, a slice, a tile, a block, or the like, and may be included in a bitstream on the basis of a unit, such as a video parameter set (VPS), a sequence parameter set (SPS), a picture parameter set (PPS), a slice header, a tile header, a block header, or the like for transmission to the decoder. The decoder may perform parsing on the basis of the same level unit, and may reconstruct the setting information transmitted from the encoder for use in an image decoding process. Each parameter set has a unique ID value, and a lower parameter set may have an ID value of a higher parameter set to be referenced. For example, the lower parameter set may refer to information on the higher parameter set having the matching ID value among one or more higher parameter sets. Among the various examples of the above-described units, when any one unit includes one or more other units, the unit is referred to as a parent unit and the included units are referred to as child units.

The setting information occurring in the unit may include the detail of a setting independent of each unit or the detail of a setting dependent on the previous unit, the subsequent unit, the parent unit, or the like. Herein, it will be understood that the dependent setting indicates, using flag information (for example, a 1-bit flag; a value of 1 indicates Follow and a value of 0 indicates Do Not Follow) showing whether the setting of the previous, subsequent, or parent unit is followed, setting information of the corresponding unit. In the present invention, the setting information will be described, focusing on an example of the independent setting. However, an example may also be included in which a relation dependent on the setting information of the previous, subsequent, or parent unit of the current unit is added or substituted.

Hereinafter, preferred embodiments of the present invention will be described in detail with reference to the accompanying drawings.

FIG. 1 is a conceptual diagram illustrating an image encoding and decoding system according to an embodiment of the present invention.

Referring to FIG. 1, an image encoding apparatus 105 and an image decoding apparatus 100 may each be a user terminal such as a personal computer (PC), a laptop computer, a personal digital assistant (PDA), a portable multimedia player (PMP), the PlayStation Portable (PSP), a wireless communication terminal, a smart phone, a TV, or the like; or may each be a server terminal such as an application server, a service server, or the like. The image encoding apparatus 105 and the image decoding apparatus 100 may include various devices having a communication device, such as a communication modem, for communicating with various devices or a wired/wireless network, memories 120 and 125 for storing different types of programs and data for inter or intra prediction so as to encode or decode an image, processors 110 and 115 for executing programs to perform operation and control, and so on. Further, an image encoded into a bitstream by the image encoding apparatus 105 may be transmitted to the image decoding apparatus 100 in real time or in non-real time through a wired/wireless network, such as the Internet, a short-range wireless network, a wireless LAN, a WiBro network, a mobile network, or the like, or through a variety of communication interfaces, such as a cable, a universal serial bus (USB), or the like. Then, the bitstream may be decoded by the image decoding apparatus 100 to be reconstructed and reproduced into the image. Further, the image encoded into the bitstream by the image encoding apparatus 105 may be transmitted from the image encoding apparatus 105 to the image decoding apparatus 100 through a computer-readable recording medium.

Figure 2:
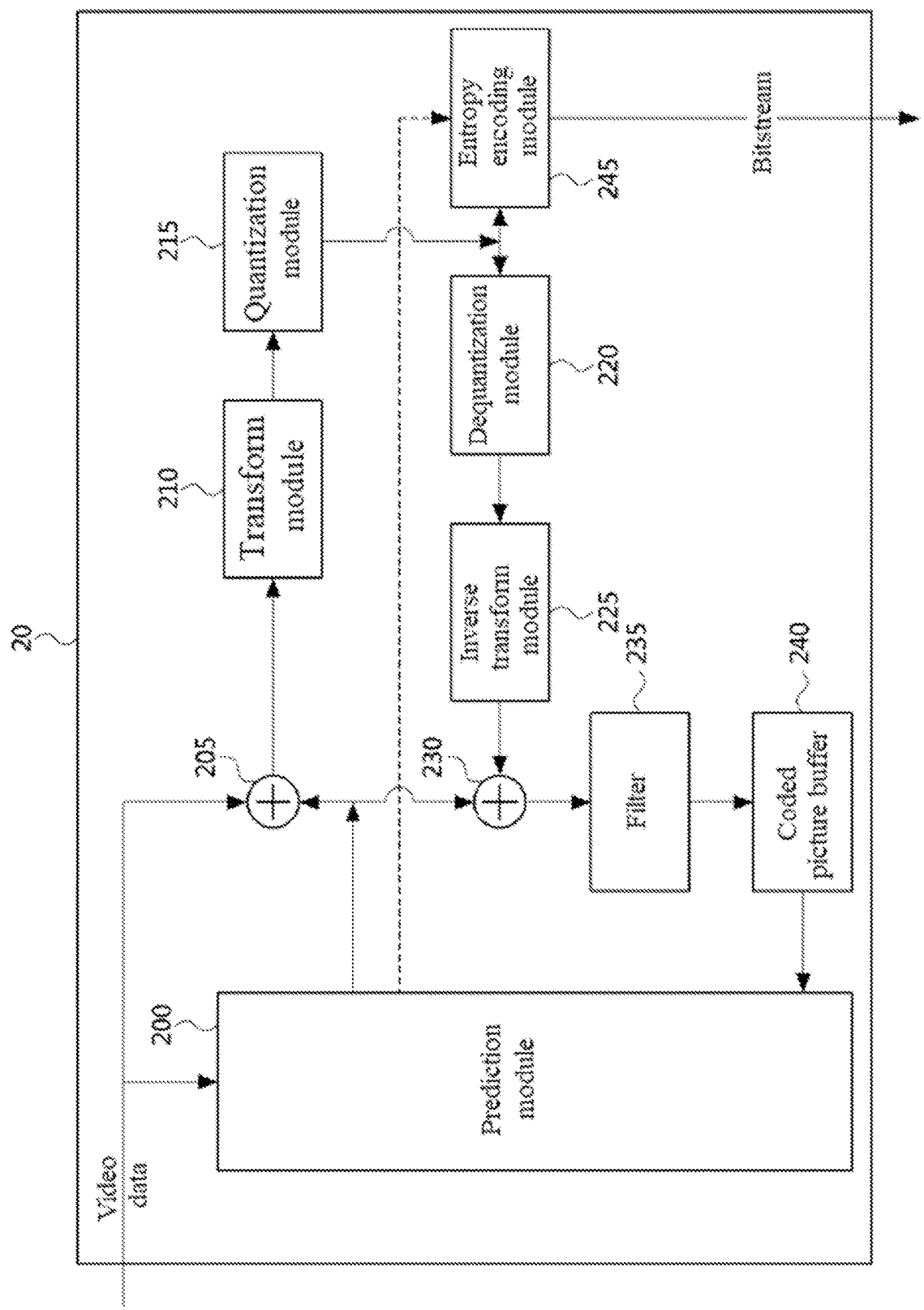
FIG. 2 is a block diagram illustrating an image encoding apparatus according to an embodiment of the present invention.

FIG. 2 is a block diagram illustrating an image encoding apparatus according to an embodiment of the present invention.

An image encoding apparatus 20 according to the embodiment may include, as shown in FIG. 2, a prediction module 200, a subtractor 205, a transform module 210, a quantization module 215, a dequantization module 220, an inverse transform module 225, an adder 230, a filter module 235, a coded picture buffer 240, and an entropy encoding module 245.

The prediction module 200 may include an intra prediction module performing intra prediction and an inter prediction module performing inter prediction. In intra prediction, a pixel of a block adjacent to the current block may be configured as a reference pixel to determine an intra prediction mode, and a prediction block may be generated using the intra prediction mode. In inter prediction, one or more reference pictures may be used to determine motion information of the current block, and motion compensation may be performed using the motion information, thereby generating a prediction block. Which method among intra prediction and inter prediction is used for the current block (a coding unit or a prediction unit) may be determined, and detailed information (for example, an intra prediction mode, a motion vector, a reference picture, or the like) according to each prediction method may be determined. Herein, a processing unit on which prediction is performed and a processing unit in which the prediction method and the detailed content are determined may be determined according to the encoding/decoding setting. For example, the prediction method, the prediction mode, and the like may be determined on the basis of the prediction unit (or coding unit), and prediction may be performed on the basis of the prediction block (the coding unit, or a transform unit).

The subtractor 205 may generate a residual block by subtracting the prediction block from the current block. That is, the subtractor 205 calculates a difference between a pixel value of each pixel of the current block to be encoded and a prediction pixel value of each pixel of the prediction block generated by the prediction module so as to generate the residual block, which is a residual signal in the form of a block.

The transform module 210 transforms the residual block into a frequency domain to transform each pixel value of the residual block into a frequency coefficient. Herein, the transform module 210 transforms the residual signal into the frequency domain using various transform schemes for transforming an image signal of a spatial axis into a frequency axis, such as Hadamard transform, discrete cosine transform (DCT)-based transform, discrete sine transform (DST)-based transform, Karhunen Loeve transform (KLT)-based transform, and the like. The residual signal transformed into the frequency domain turns into a frequency coefficient.

The quantization module 215 quantizes the residual block having the frequency coefficient transformed into the frequency domain by the transform module 210. Herein, the quantization module 215 may quantize the transformed residual block using dead zone uniform threshold quantization, a quantization weighted matrix, an improved quantization scheme thereof, or the like. This may use one or more quantization schemes as candidates, and may be determined by an encoding mode, prediction mode information, or the like.

The entropy encoding module 245 scans a generated quantization frequency coefficient string according to various scanning methods to generate a quantization coefficient string; generates a syntax element by various binarization methods (fixed length binarization, unary binarization, truncated rice binarization, k-th order exp-golomb, and the like) regarding encoding information generated in an encoding process; and encodes the syntax element using various entropy encoding schemes, such as context adaptive binary arithmetic coding (CABAC), context adaptive variable length coding (CAVLC), or the like for output. A scan pattern may be set to be one among various patterns, such as zigzag, diagonal, raster scan patterns, and the like.

The dequantization module 220 dequantizes the residual block quantized by the quantization module 215. That is, the quantization module 220 generates the residual block having the frequency coefficient by dequantizing the quantization frequency coefficient string.

The inverse transform module 225 inverse transforms the residual block dequantized by the dequantization module 220. That is, the inverse transform module 225 inverse transforms the frequency coefficients of the dequantized residual block to generate a residual block having a pixel value, namely, a reconstructed residual block. Herein, the inverse transform module 225 may perform inverse transform by using the transform method used by the transform module 210 inversely.

The adder 230 reconstructs the current block by adding the prediction block predicted by the prediction module 200 and the residual block reconstructed by the inverse transform module 225. The reconstructed current block may be stored as the reference picture (or reference block) in the decoded picture buffer 240 and may be referenced when another block or picture is encoded.

The filter module 235 may include one or more post-processing filter processes such as a deblocking filter, a sample adaptive offset (SAO), an adaptive loop filter (ALF), and the like. The deblocking filter may remove block distortion occurring at the boundary between blocks in the reconstructed picture. The ALF may perform filtering based on a value obtained by comparing the reconstructed block after the block is filtering through the deblocking filter and the original image. The SAO reconstructs the offset difference with the original image on a per-pixel basis with respect to the residual block to which the deblocking filter is applied, and may be applied in the form of a band offset, an edge offset, or the like. Such a post-processing filter may be applied to the reconstructed picture or block.

The coded picture buffer 240 may store the block or picture reconstructed through the filter module 235. The reconstructed block or picture stored in the decoded picture buffer 240 may be provided to the prediction module 200 performing intra prediction or inter prediction.

Although not shown in the drawings, a partitioning module may be further included, and the partitioning module may perform partitioning into coding units in various sizes. Herein, the coding unit may be composed of multiple coding blocks (for example, one luminance coding block, two chrominance coding blocks, and the like) according to a color format. For convenience of description, one color component unit is assumed. The coding block may have a variable size such as M×M (for example, M is 4, 8, 16, 32, 64, 128, and the like). Alternatively, according to a partitioning method (for example, tree-based partitioning, quad tree partitioning, binary tree partitioning, and the like), the coding block may have a variable size such as M×N (for example, M and N are 4, 8, 16, 32, 64, 128, and the like). Herein, the coding block may be a unit that is the basis of intra prediction, inter prediction, transform, quantization, entropy encoding, or the like.

In the present invention, a description is made under the assumption that multiple subblocks in the same size and shape are obtained according to the partitioning methods. However, application to the case of an asymmetrical subblock (for example, in the case of a binary tree, 4M×4N is partitioned into 3M×4N/M×4N, 4M×3N/4M×N, or the like) is possible. Herein, the asymmetrical subblock may be supported by information for determining whether a partitioning method for obtaining a symmetrical subblock is additionally supported according to the encoding/decoding setting.

Partitioning of the coding block (M×N) may have a recursive tree-based structure. Herein, whether to perform partitioning may be indicated by a partitioning flag (for example, a quad tree partitioning flag, and a binary partitioning flag). For example, when the partitioning flag of the coding block having the partitioning depth of k has a value of 0, encoding of the coding block is performed on the coding block having the partitioning depth of k. When the partitioning flag of the coding block having the partitioning depth of k has a value of 1, encoding of the coding block is performed on four sub coding blocks (quad tree partitioning) or two sub coding blocks (binary tree partitioning) having the partitioning depth of k+1 according to the partitioning method. Herein, the size of the block may be (M>>1)× (N>>1) in the case of four coding blocks, and may be (M>>1)×N or M×(N>>1) in the case of two coding blocks. The sub coding block may be set to a coding block (k+1) and then may be partitioned into sub coding blocks (k+2) through the above process. Herein, in the case of quad tree partitioning, one partitioning flag (for example, a flag indicating whether partitioning is performed) may be supported. In the case of binary tree partitioning, at least one (or two or more) flag (for example, in addition to the flag indicating whether partitioning is performed, a partitioning direction flag (horizontal or vertical direction, this may be omitted in some cases depending on the result of preceding higher or previous partitioning)) may be supported.

The block partitioning may be performed starting from the maximum coding block to the minimum coding block. Alternatively, the block partitioning may be performed starting from the minimum partitioning depth (0) to the maximum partitioning depth. That is, until the size of the block reaches the size of the minimum coding block or until the partitioning depth reaches the maximum partitioning depth, partitioning may be performed in a recursive manner. Herein, according to the encoding/decoding setting (for example, the image (slice, tile) types (I/P/B), the encoding modes (intra/inter), chrominance components (Y/Cb/Cr), or the like), the size of the maximum coding block, the size of the minimum coding block, and the maximum partitioning depth may be adaptively set.

For example, when the maximum coding block is in a size of 128×128, quad tree partitioning is performed in a range of 8×8 to 128×128, and binary tree partitioning is performed in the case of a range of 4×4 to 32×32 and the maximum partitioning depth of 3. Alternatively, quad tree partitioning may be performed in a range of 8×8 to 128×128, and binary tree partitioning may be performed in the case of a range of 4×4 to 128×128 and the maximum partitioning depth of 3. The former case may relate to the setting in an I image type (for example, a slice), and the latter case may relate to the setting in a P or B image type. As described in the above example, the partitioning settings such as the size of the maximum coding block, the size of the minimum coding block, the maximum partitioning depth, and the like may be supported in common or individually according to the partitioning methods and the above-described encoding/decoding setting.

When the multiple partitioning methods are supported, partitioning is performed within a block support range of each partitioning method. When the block support ranges of each partitioning method overlap, priority of the partitioning methods is present. For example, quad tree partitioning may precede binary tree partitioning. Further, when the multiple partitioning methods are supported, whether to perform the following partitioning is determined depending on the result of the preceding partitioning. For example, when the result of the preceding partitioning indicates that partitioning is performed, the following partitioning is not performed and the sub coding block resulting from the preceding partitioning is set to the coding block to be partitioned.

Alternatively, when the result of the preceding partitioning indicates that partitioning is not performed, partitioning is performed depending on the result of the following partitioning. Herein, when the result of the following partitioning indicates that partitioning is performed, the sub coding block resulting from the partitioning is set to the coding block to be partitioned. When the result of the following partitioning indicates that partitioning is not performed, no further partitioning is performed. Herein, even in the case where the result of the following partitioning indicates that partitioning is performed and where the multiple partitioning methods are supported even when the sub coding block resulting from the partitioning is set to the coding block (for example, in the case where the block support ranges of the respective partitioning methods overlap), the preceding partitioning is not performed and only the following partitioning is supported. That is, in the case where the multiple partitioning methods are supported, when the result of the preceding partitioning indicates that partitioning is not performed, it refers to the fact that no more preceding partitioning is performed.

For example, regarding to an M×N coding block, when quad tree partitioning and binary tree partitioning are possible, first, the quad tree partitioning flag is checked. When the partitioning flag has a value of 1, partitioning into four sub coding blocks in a size of (M>>1)×(N>>1) is performed and the sub coding blocks are set to coding blocks to be subjected to partitioning (quad tree partitioning or binary tree partitioning). When the partitioning flag has a value of 0, the binary tree partitioning flag is checked. When the flag has a value of 1, partitioning into two sub coding blocks each being in a size of (M>>1)×N or M×(N>>1) is performed and the sub coding blocks are set to coding blocks to be subjected to partitioning (binary tree partitioning). When the partitioning flag has a value of 0, the partitioning process is terminated and encoding is performed.

Although the case where the multiple partitioning methods are performed has been described through the above example, no limitation thereto is imposed and a combination of various partitioning methods is supported. For example, partitioning methods, such as quad tree/binary tree/quad tree+binary tree, and the like, may be used. Herein, the default partitioning method may be set to a quad tree method, and an additional partitioning method may be set to a binary tree method. Information on whether the additional partitioning method is supported may be implicitly determined or may be explicitly included in a unit, such as a sequence, a picture, a slice, a tile, or the like.

In the above example, information related to partitioning, such as information on the size of the coding block, the support range of the coding block, the maximum partitioning depth, and the like may be included in a unit such as a sequence, a picture, a slice, a tile, or the like, or may be implicitly determined. In summary, the range of allowable blocks may be determined by the size of the maximum coding block, the range of supported blocks, the maximum partitioning depth, and the like.

The coding block obtained by performing partitioning through the above process may be set to be in the maximum size for intra prediction or inter prediction. That is, the coding block in which block partitioning is terminated may be in the size in which partitioning of the prediction block starts for intra prediction or inter prediction. For example, when the coding block is in a size of 2M×2N, the prediction block is in a size of 2M×2N or M×N, which is equal to or smaller than that. Alternatively, a size of 2M×2N, 2M×N, M×2N, or M×N may be provided. Alternatively, a size of 2M×2N, which is the same as the size of the coding block, may be provided. Herein, the fact that the coding block and the prediction block are the same in size may refer to the fact that partitioning of the prediction block is not performed and prediction is performed with the size obtained through partitioning of the coding block. That is, it refers to the fact that partitioning information for the prediction block is not generated. Such a setting may also be applied to the transform block, and transform may be performed on the basis of the partitioned coding block.

According to the following encoding/decoding setting, various configurations are possible. For example, (after the coding block is determined) on the basis of the coding block, at least one prediction block and at least one transform block may be obtained. Alternatively, one prediction block in the same size as the coding block may be obtained, and at least one transform block may be obtained on the basis of the coding block. Alternatively, one prediction block in the same size as the coding block and one transform block may be obtained. In the above example, when at least one block is obtained, partitioning information of each block occurs (is generated). When one block is obtained, partitioning information of each block does not occur.

Square or rectangular blocks in various sizes obtained according to the result may be blocks used for intra prediction and inter prediction, and may be blocks used for transform on a residual component and quantization.

Figure 3:
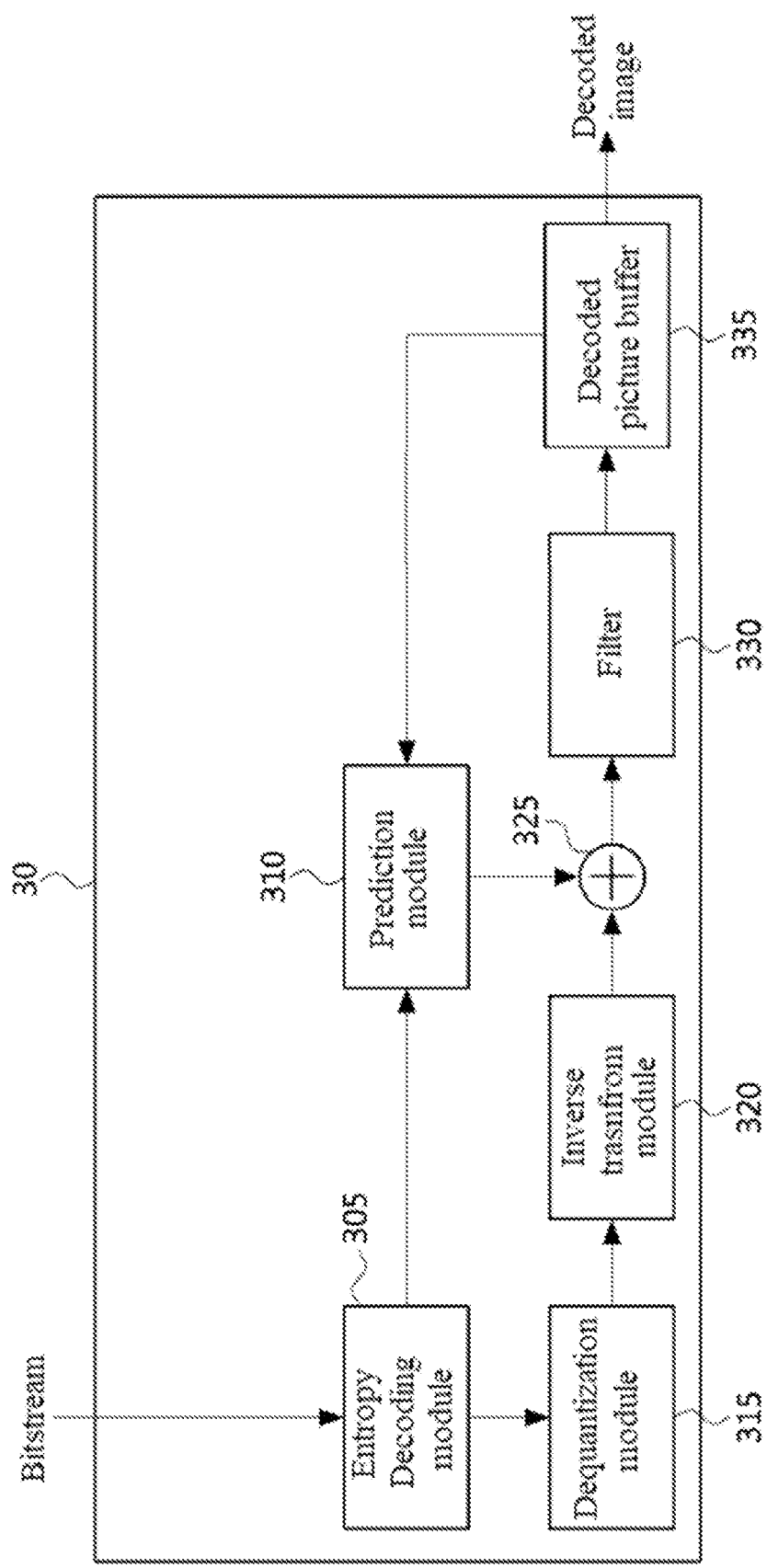
FIG. 3 is a diagram illustrating a configuration of an image decoding apparatus according to an embodiment of the present invention.

FIG. 3 is a diagram illustrating a configuration of an image decoding apparatus according to an embodiment of the present invention.

Referring to FIG. 3, an image decoding apparatus 30 may include an entropy decoding module 305, a prediction module 310, a dequantization module 315, an inverse transform module 320, an adder and subtractor 325, a filter 330, and a decoded picture buffer 335.

Further, the prediction module 310 may include an intra prediction module and an inter prediction module.

The entropy decoding module 305 may receive, from the bitstream transmitted from the image encoding apparatus 20, a quantization coefficient string, a transform coefficient string, a signal string, or the like; may decode the string by using an entropy decoding scheme (CABAC, CAVLC, or the like); and may transmit data obtained by receiving a syntax element related to decoding information to the prediction module 310.

The prediction module 310 may generate a prediction block on the basis of data transmitted from the entropy decoding module 305. The prediction module 310 performs the same process as the prediction module 200 of the image encoding apparatus 20 described above.

The dequantization module 315 may dequantize the quantized transform coefficients that are provided into a bitstream and decoded by the entropy decoding module 305.

The inverse transform module 320 may generate a residual block by applying, to a transform coefficient, inverse DCT, inverse integer transform, or inverse transform schemes having the concept similar thereto.

Herein, the dequantization module 315 and the inverse transform module 320 perform the inverse of the processes that are performed by the transform module 210 and the quantization module 215 of the image encoding apparatus 20 above described, and may be implemented in various ways. For example, the same process and inverse transform shared with the transform module 210 and the quantization module 215 may be used, and information (for example, the transform size, the transform shape, the quantization type, or the like) on transform and quantization processes from the image encoding apparatus 20 may be used to perform the inverse of the transform and quantization processes.

The residual block subjected to the dequantization and inverse transform processes may be added to the prediction block derived by the prediction module 310 so that a reconstructed image block is generated. This addition may be performed by the adder and subtractor 325.

The filter 330 may apply, with respect to the reconstructed image block, a deblocking filter to remove a blocking phenomenon if necessary, and may further use other loop filters before and after the decoding process to enhance video quality.

The image block subjected to reconstruction and filtering may be stored in the decoded picture buffer 335.

Although not shown in the drawing, the image decoding apparatus 30 may further include a partitioning module. Herein, the partitioning module may include a picture partitioning module and a block partitioning module. The partitioning module which is the same or corresponding configuration of the image encoding apparatus shown in FIG. 2 can be easily understood by a person skilled in the art, and thus a detailed description will be omitted.

Figure 4:
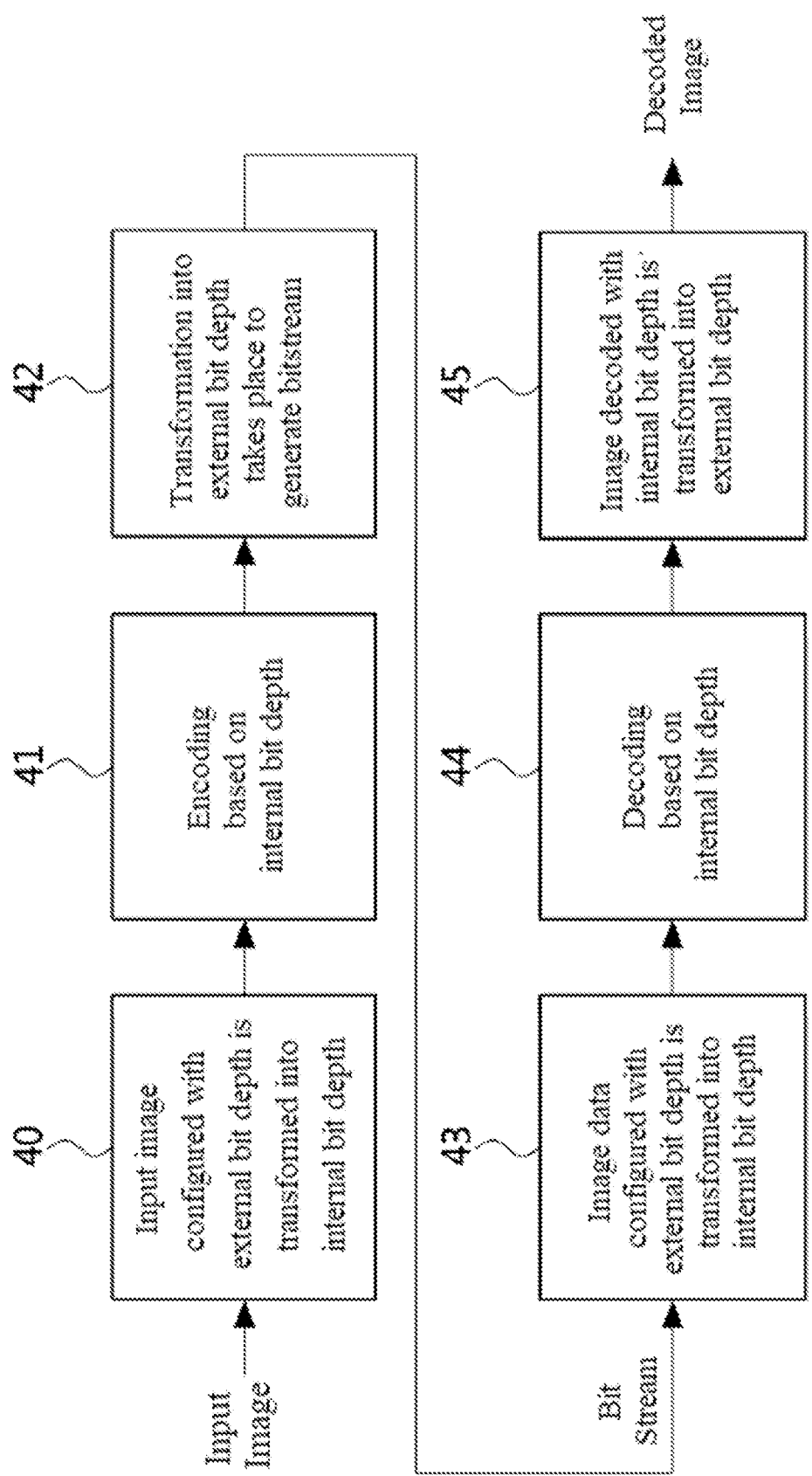
FIG. 4 is a conceptual diagram illustrating a bit depth according to an embodiment of the present invention.

FIG. 4 is a conceptual diagram illustrating a bit depth according to an embodiment of the present invention.

The bit depth is a unit indicating the number of pixel values representing one pixel. When the bit depth is n bits, $2^n$ pixel values are represented. Therefore, the pixel value range may be determined according to the bit depth. As the bit depth increases, pixels to be represented much diversify and the sharpness is thus increased.

In the present invention, regarding the bit depth, multiple bit depths may be supported according to the color components. Herein, the multiple bit depths may be divided into an external bit depth (or a first bit depth) and an internal bit depth (or a second bit depth).

Herein, the external bit depth may be a bit depth determined at a step of setting (or generating) encoding/decoding information, and the internal bit depth may be a depth used in the process of performing encoding/decoding, apart from the external bit depth. In general, the external bit depth may have the same value as the internal bit depth and may be set as a default bit depth. However, in the present invention, the internal bit depth distinguished from the external bit depth may be used additionally.

The internal bit depth having a value different from a value of the external bit depth may be supported. When it is determined to use the internal bit depth, the internal bit depth is set as the default bit depth and encoding/decoding is performed. Alternatively, when it is determined only to use the external bit depth, the external bit depth is set as the default bit depth and encoding/decoding is performed. Whether the use of the internal bit depth is allowed and whether the internal bit depth is used may be included in a bitstream on the basis of a unit such as a sequence, a picture, a slice, a tile, or the like for transmission. The decoding apparatus may parse the included information to reconstruct information on whether the internal bit depth is used and allowed.

In the meantime, when the internal bit depth distinguished from the external bit depth is used, the internal bit depth and the external bit depth have a difference of at least 1 bit. More preferably, the internal bit depth is set to have a greater value than the external bit depth. That is, apart from the external bit depth, when the internal bit depth representing a wider range of pixel values is used, a rounding error occurring in the process of performing encoding/decoding is reduced, thereby enhancing the encoding/decoding performance.

Accordingly, describing the example of utilizing the internal bit depth with reference to FIG. 4, an input image to be encoded by the image encoding apparatus may be an image configured on the basis of a predetermined bit depth. Herein, when the bit depth with which the input image is configured is referred to as the external bit depth described above, the image encoding apparatus transforms (40) the input image configured with the external bit depth into the internal bit depth (particularly, having a greater bit value) which is distinguished from the external bit depth. Next, the input image transformed into the internal bit depth is encoded (41) on the basis of the internal bit depth, and image data obtained by performing encoding according to the internal bit depth is transformed back into the external bit depth so that a bitstream is generated (42).

When the image decoding apparatus according to the embodiment of the present invention receives the bitstream from the image encoding apparatus, the image data constituting the received bitstream is transformed (43) into the internal bit depth and decoding is performed (44) on the basis of the internal bit depth. Next, the image data decoded according to the internal bit depth is transformed (45) back into the external bit depth, and consequently, the decoded image is obtained.

Herein, the transform (41) from the external bit depth to the internal bit depth may be performed through a shift operation from n bits to m bits when the external bit depth is referred to as n bits and the internal bit depth is referred to as m bits. Further, the inverse transform (42) from the internal bit depth to the external bit depth may be performed through a round operation from m bits to n bits. Further, it may be performed through another pre-processing/post-processing process other than the operation process.

The internal bit depth may be applied in at least one among image encoding/decoding processes, such as an intra or inter prediction process, a transform and quantization process, a dequantization and inverse transform process, an in-loop filtering process, an entropy encoding/decoding process, and the like. Therefore, the transform between the external bit depth and the internal bit depth may be performed before or after the operation of the prediction module, the transform module and the quantization module, the dequantization module and the inverse transform module, an in-loop filter module (or filter module), and the entropy encoding/decoding module in FIG. 2 or 3. Specifically, for example, before the input image is input to the subtractor, transform from the external bit depth to the internal bit depth may take place, and before being output as an output image, transform from the internal bit depth to the external bit depth may take place. Further, when the reconstructed image is stored in the memory, transform from the internal bit depth to the external bit depth takes place. When the reconstructed image is referenced for the prediction module in the memory, transform from the external bit depth to the internal bit depth takes place. Alternatively, before a difference block obtained by the subtractor is transformed by the transform module 210 in FIG. 2, transform from the external bit depth to the internal bit depth may take place. After being transformed by the transform module 210, transform from the internal bit depth to the external bit depth may take place. Alternatively, before being inverse transformed by the inverse transform module 225 in FIG. 2, transform from the external bit depth to the internal bit depth may take place. After being inverse transformed by the inverse transform module 225, transform from the internal bit depth to the external bit depth may take place.

Further, one or more internal bit depths according to the embodiment of the present invention may be used. For example, a first internal bit depth may be applied to a part of the process of performing encoding/decoding, and a second internal bit depth may be applied to the remaining part.

The external bit depth and the internal bit depth may be information explicitly determined according to the setting of the encoder/decoder. Further, the external bit depth may be information explicitly determined, and the internal bit depth may be information implicitly determined. Herein, the term "explicitly" means that the encoding apparatus and the decoding apparatus transmit/receive corresponding information to/from each other. The term "implicitly" means that the decoding apparatus and the encoding apparatus use a preset value rather than transmit and receive the corresponding information.

As information (or a syntax element) indicating the external bit depth, a bit value for the external bit depth may be used, or a difference value between the bit value of the external bit depth and a preset value may be used.

As information (or a syntax element) indicating the internal bit depth, a bit value for the internal bit depth may be used, or a difference value between the bit value of the internal bit depth and a preset value may be used. Further, a difference value between the internal bit depth and the external bit depth may be used as information indicating the internal bit depth.

Herein, the information indicating the syntax element may be encoded/decoded using various binarization methods (fixed length binarization, unary binarization, truncated rice binarization, k-th order exp-golomb, and the like).

The bit values of the external bit depth and the internal bit depth may have various ranges. Herein, the range that the bit values of the internal bit depth have may be equal to or wider than the range that the bit values of the external bit depth have, and may be selected from a range having a bit value which is greater than the bit value in the range that the bit values of the external bit depth have. For example, assuming that the bit value of the external bit depth is selected between 8 bits and 16 bits, the bit value of the internal bit depth may be selected between 8 bits and 16 bits (the same range as the external bit depth) or may be selected between 10 bits and 16 bits or between 10 bits and 18 bits (the range having the bit value greater than that of the external bit depth).

Herein, although the description has been made on the premise of application to one color component, the setting equal to or different from a part or the entire of the example may be applied according to the color components, and various modifications and expansions are possible. Further, based on a hierarchical encoding/decoding method (HDR/WCG, a scalable video coding, or the like) for spatial, temporal, image quality expandabilities/compatibilities, and the like, the description has been made on the premise that among an image belonging to a base layer and an image belonging to an enhancement layer which are distinguished by a layer identifier, application to the image belonging to the base layer takes place. However, the setting equal to or different from a part or the entire of the example is possible, and various modifications and expansions are possible. Also, the setting having dependence/independence according to the layer may be determined under the encoding/decoding setting. The base layer and the enhancement layer may differ in encoding/decoding configuration according to the setting of the encoder/decoder, and thus the changed configuration of the example may be understood. This may be a description applied overall to the present invention, including the above-described bit depth as well as an adaptive pixel value adjustment process described below. In the following example, for convenience of description, a description will be made, focusing on the case where the external bit depth has the same value as the internal bit depth and is set as the default bit depth.

The pixel value range supported according to the bit depth (bit_depth) may be a range of 0 to $2^{bit\_depth}-1$ according to each color format, component, or the like, or may be a range of $-2^{bit\_depth-1}$ to $2^{bit\_depth-1}-1$. Hereinafter, a description will be based on the range of 0 to $2^{bit\_depth}-1$. Further, the pixel value range may refer to a range in a spatial domain.

Figure 5:
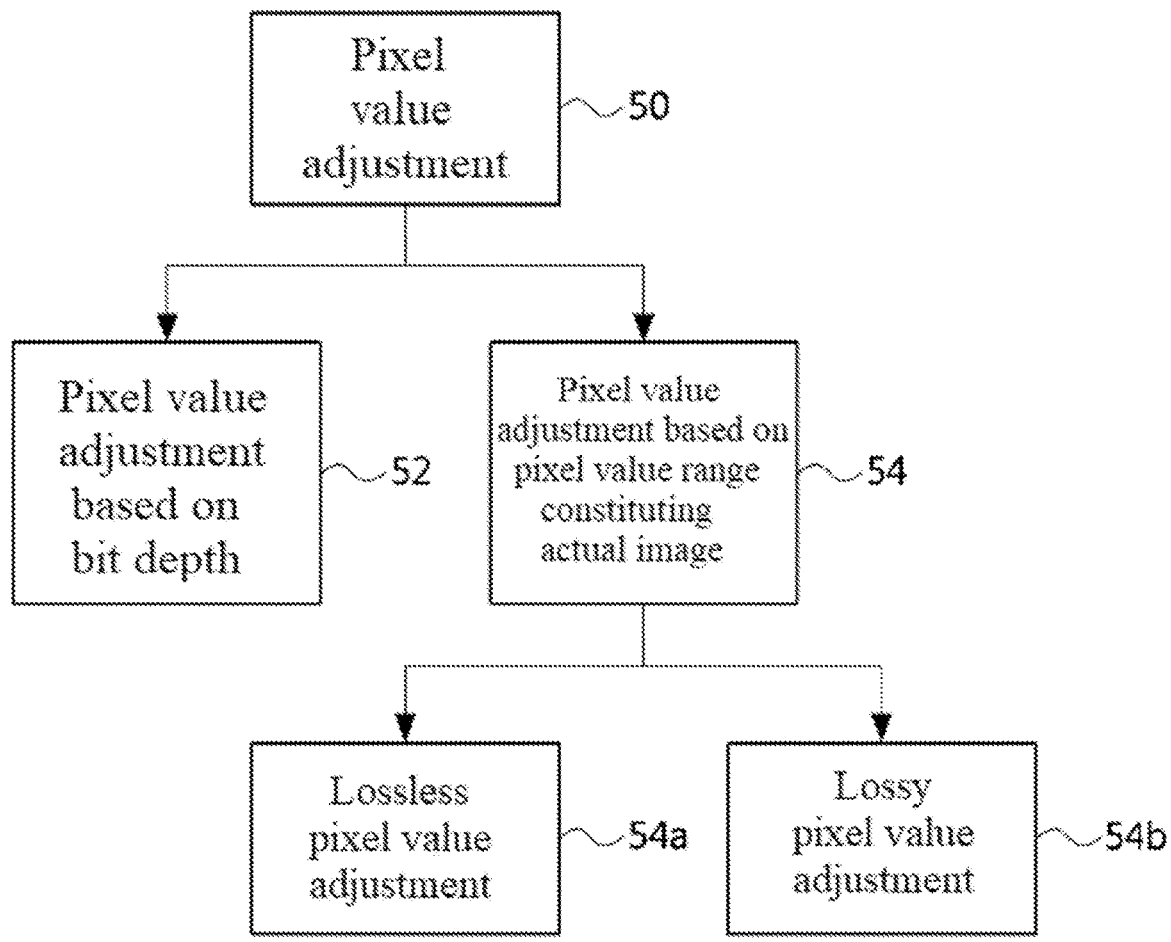
FIG. 5 is an exemplary diagram illustrating an adaptive pixel value adjustment method according to an embodiment of the present invention.

FIG. 5 is an exemplary diagram illustrating an adaptive pixel value adjustment method according to an embodiment of the present invention.

In the image encoding/decoding process, the case where an input pixel value is different from an output pixel value may occur. Sometimes, the case of exceeding an allowed pixel value range may occur. In order to prevent distortion caused by such an operation error, a pixel value adjustment process may be performed. The pixel value adjustment method is a process of adjusting a pixel value exceeding the pixel value range to be within the pixel value range, and may be referred to as clipping.

TABLE 1 pixel_val' = Clip_x (pixel_val, $min_I$, $max_I$)
Clip_x (A, B, C)
{
  if( A < B ) output = B;
  else if( A > C ) output = C;
  else output = A;
}

Table 1 shows an example code for a clipping function (Clip_x) in which pixel value adjustment is performed. Referring to Table 1, the input pixel value (pixel_val), the minimum value ($min_I$) and the maximum value ($max_I$) in the allowed pixel value range may be input as parameters of the clipping function (Clip_x). Herein, giving a description based on the bit depth (bit_depth), the minimum value ($min_I$) may be 0 and the maximum value ($max_I$) is $2^{bit\_depth}-1$. When the clipping function (Clip_x) is performed, the input pixel value (pixel_val, parameter A) less than the minimum value ($min_I$, parameter B) is changed to the minimum value ($min_I$) and the input pixel value greater than the maximum value ($max_I$, parameter C) is changed to the maximum value ($max_I$). Therefore, when an output value in which pixel value adjustment is completed is returned, the output value is stored as an output pixel value (pixel_val') in which pixel value adjustment is completed.

Herein, the range of pixel values is determined according to the bit depth, but the pixel values constituting the actual image (which may have units such as a picture, a slice, a tile, a block, or the like) have different types and characteristics of images, so the pixel values do not necessarily occur within all pixel value ranges. For example, some images may be composed of pixels having high pixel values, and some images may be composed of pixels having pixel values selected from a wide range. Therefore, according to the embodiment of the present invention, the pixel value range constituting the actual image is referenced to be utilized in the image encoding/decoding process.

For example, in the pixel value adjustment method according to Table 1, the minimum value ($min_I$) of the clipping function may be used as the smallest value among the pixel values constituting the actual image, and the maximum value ($max_I$) of the clipping function may be used as the largest value among the pixel values constituting the actual image. Therefore, assuming that the pixel values constituting the actual image are between 0 and $2^{bit\_depth}-1$ on the basis of the bit depth (bit_depth), the minimum value of the clipping function may be equal to greater than 0, and the maximum value of the clipping function may be equal to or less than $2^{bit\_depth}-1$.

Referring to FIG. 5, the pixel value adjustment method according to the embodiment of the present invention may include a pixel value adjustment method 52 based on the bit depth and/or a pixel value adjustment method 54 based on the pixel value range constituting the actual image.

Herein, the pixel value adjustment method 52 based on the bit depth may be a method using the maximum value and the minimum value in the pixel value range determined according to the bit depth, intended to prevent distortion of the pixel value. As an example of the pixel value adjustment method 52 based on the bit depth, when the default bit depth is 8 bits, the pixel value according to the bit depth has a value between 0 and 255. Thus, when the input pixel value is less than 0, adjustment into 0 takes place. When the input pixel value is greater than 255, adjustment into 255 takes place.

Herein, the pixel value adjustment method 54 based on the pixel value range constituting the actual image may be a method using the maximum value and the minimum value of the pixel values constituting the actual image, intended to enhance the encoding/decoding performance. Further, the pixel value adjustment method 54 based on the pixel value range constituting the actual image may be divided into a lossless pixel value adjustment method 54a and a lossy pixel value adjustment method 54b.

Herein, the lossless pixel value adjustment method 54a may be a method in which the maximum value and the minimum value of the pixel values constituting the actual image are intactly used. As an example of the lossless pixel value adjustment method 54a, in the case where the default bit depth is 8 bits and the pixel values constituting the actual image have values between 0 and 200, when the input pixel value is less than 0, adjustment into 0 takes place. When the input pixel value is greater than 200, adjustment into 200 takes place.

The lossy pixel value adjustment method 54b may be a method in which values close to the maximum value and the minimum value of the pixel values constituting the actual image are used. Specifically, the pixel value range may be divided into multiple bands having predetermined pixel value intervals. Herein, a variable k capable of defining the multiple bands, which are $2^k$ bands, may be set. Herein, in the case where k is set to 3 and the pixel value range is divided into $2^3$ bands with respect to the pixel value range (of 0 to 255) when the default bit depth is 8, one band may have a pixel value interval of $2^5$. Assuming such a state, lossy pixel value adjustment may be performed using information indicating to which band the maximum value and the minimum value of the pixel values constituting the actual image belong. That is, when the minimum value of the pixel values constituting the actual image is 33 and the maximum value is 220, the representative value (for example, 32) of the band to which the value of 33 belongs is used as the minimum value for pixel value adjustment and the representative value (for example, 224) of the band to which the maximum value belongs is used as the maximum value for pixel value adjustment. Herein, the representative values may be preset for the respective bands. Further, herein, the variable k denoting the number of bands which divides the pixel value range may be explicitly generated in the encoding process, and may then be transmitted to the decoding apparatus. Furthermore, the pixel value intervals constituting one band may be configured to be uniform or non-uniform.

Therefore, at least one among the pixel value adjustment methods 52, 54, 54a, and 54b in FIG. 5 may be supported according to the encoding/decoding setting. Accordingly, at least one among the pixel value adjustment methods in FIG. 5 may be adaptively selected according to the actual image, the performance of the encoding apparatus and the decoding apparatus, or the like, and may then be applied in the encoding and/or decoding process. Information on whether the adaptive pixel value adjustment process is supported and on pixel value adjustment process selection may be included in the bitstream on the basis of a unit such as a sequence, a picture, a slice, a tile, a block, or the like for transmission to the decoding apparatus. The decoding apparatus may reconstruct the corresponding information from the received bitstream.

Further, whether the adaptive pixel value adjustment process is supported may be implicitly determined according to the setting of the encoder/decoder. For example, when a quantization parameter is 0 (in this example, lossless encoding, specifically, transform, quantization, the inverse processes thereof, the in-loop filter module, and the like are not performed), adaptive pixel value adjustment is not supported and the pixel value adjustment process based on the bit depth is implicitly selected so that encoding/decoding is performed.

In the image (the picture unit in this example), information on whether the pixel value adjustment process is supported and at least one piece of information on the pixel value adjustment process selection may be generated, and at least one piece of information on the pixel value range applied to the pixel value adjustment process may be generated. For example, when one piece of information on the pixel value range is generated, related information is generated in the parent unit (for example, a sequence, a picture, or the like). Alternatively, when one piece of information on the pixel value range is generated, related information is generated in the first child unit (for example, a picture, a tile, a slice, or the like, specifically, the first of one or more child units within one parent unit). When two or more pieces of information on the pixel value range are generated, related information is generated in the parent unit. Alternatively, when two or more pieces of information on the pixel value range are generated, related information is generated in two or more child units.

The adaptive pixel value adjustment process according to the embodiment of the present invention may be applied to the encoding/decoding process of the prediction module, the transform module, the quantization module, the dequantization module, the inverse transform module, the in-loop filter module, the memory, or the like. For example, in the pixel value adjustment method, the input pixel may be the reference pixel (reference sample) or the prediction pixel (prediction sample) in the prediction process, and may be the reconstructed pixel (reconstructed sample) in the transform, quantization, inverse transform, and dequantization processes. Further, the input pixel may be the reconstructed pixel in the in-loop filter process, and may be a storage pixel (storage sample) in the memory. Herein, the reconstructed pixel in transform, quantization, and the inverse processes thereof may refer to the reconstructed pixel before the in-loop filter is applied. The reconstructed pixel in the in-loop filter may refer to the reconstructed pixel after the in-loop filter is applied. The reconstructed pixel in the deblocking filter process may refer to the reconstructed pixel after the deblocking filter is applied. The reconstructed pixel in the SAO process may refer to the reconstructed pixel after the SAO is applied. The reconstructed pixel in the ALF process may refer to the reconstructed pixel after the ALF is applied. Although the examples of the various cases have been described above, no limitation thereto is imposed. Application takes place at input, intermediate, and output steps of the entire encoding/decoding process in which the pixel value adjustment process is called.

Furthermore, an example of adaptive pixel value adjustment for the case where the external bit depth and the internal bit depth in FIG. 4 are used is as follows.

For example, in the case where the external bit depth is 8 bits, where the internal bit depth is 12 bits, and where the adjustment method 52 (in this example, the minimum value of 0, the maximum value of 255, and based on 8 bits) based on the bit depth is selected, when the reconstructed pixel generated in the deblocking filter process in which the external bit depth is applied as the default bit depth has a value less than 0, adjustment into 0 takes place, and when the reconstructed pixel has a value greater than 255, adjustment into 255 takes place.

For example, in the case where the external bit depth is 10 bits, where the internal bit depth is 12 bits (in this example, the minimum value of 0, the maximum value of 4095, and based on 12 bits), and where the pixel value adjustment method 52 (in this example, the minimum value of 0, the maximum value of 1023, and based on 10 bits) based on the bit depth is selected, when the reconstructed pixel generated in the SAO process in which the internal bit depth is applied as the default bit depth has a value less than 0, adjustment into 0 takes place, and when the reconstructed pixel has a value greater than 4095, adjustment into 4095 takes place.

For example, in the case where the external bit depth is 8 bits, where the internal bit depth is 10 bits, and where the pixel value adjustment process 54a (in this example the minimum value of 0, the maximum value of 255, and based on 8 bits) based on the pixel value range constituting the actual image is selected, when the reconstructed pixel generated in the ALF process in which the external bit depth is applied as the default bit depth has a value less than 0, adjustment into 0 takes place, and when the reconstructed pixel has a value greater than 255, adjustment into 255 takes place.

For example, in the case where the external bit depth is 8 bits, where the internal bit depth is 12 bits, and where the pixel value adjustment method 54a (in this example, the minimum value of 20, the maximum value of 220, and based on 8 bits) based on the pixel value range constituting the actual image is selected, when the reconstructed pixel generated in the prediction, transform, quantization, dequantization, inverse transform, and in-loop filter processes in which the internal bit depth is applied as the default bit depth has a value less than 320 (20<<4), adjustment into 320 takes place, and when the reconstructed pixel has a value greater than 3520 (220<<4), adjustment into 3520 takes place.

Although the description has been made, focusing on some embodiments related to the pixel value adjustment methods, no limitation thereto is imposed. The setting equal to or different from a part or the entire of the example is possible, and modifications and expansions into various cases are possible.

FIG. 6 is an example of source code for generating a syntax element with respect to an adaptive pixel value adjustment method according to an embodiment of the present invention.

Referring to FIG. 6, the expression sps_adaptive_sample_range may be a syntax element indicating whether the adaptive pixel value adjustment process is supported in sps; the expression pps_adaptive_sample_range may be a picture-based syntax element indicating whether the adaptive pixel value adjustment process is supported in pps; and a syntax element for whether the adaptive pixel value adjustment process is supported may be defined in other units (a slice, a tile, a block, and the like).

When the syntax element indicating whether the adaptive pixel value adjustment process is supported is activated (for example, the syntax element of 1 refers to the fact that the adaptive pixel value adjustment process is supported), encoding/decoding is performed by supporting at least one pixel value adjustment process in a sequence unit (or a picture). A syntax element (adaptive_sample_range_flag) for selecting which method among the pixel value adjustment methods in FIG. 5 to be applied may be additionally generated.

When the syntax element indicating whether the adaptive pixel value adjustment process is supported is deactivated (assuming 0 in this example), encoding/decoding including one pixel value adjustment process preset in a sequence unit (or picture) is performed. Further, according to the color components, the syntax element for whether the adaptive pixel value adjustment process is supported may be defined in each unit. Further, according to the encoding/decoding setting (QP, or the like in this example), the syntax element may not be generated.

The expression adaptive_sample_range_flag may be a syntax element for selecting which method among the pixel value adjustment methods to be applied in pps, and a syntax element for selecting the pixel value adjustment method may be defined in other units (a sequence, a slice, a tile, a block, and the like). The syntax element may be defined in at least one unit (a picture, a slice, a tile, a block, or the like in this example) or may be defined in only one unit (selected among a picture, a slice, a tile, a block, and the like in this example).

Regarding the syntax element (adaptive_sample_range_flag) for selecting which method among the pixel value adjustment methods to be applied, a candidate group for two or more pixel value adjustment processes may be provided for selection therefrom. When the pixel value adjustment method 52 based on the bit depth in FIG. 5 is selected with reference to the syntax element (adaptive_sample_range_flag), the minimum value and the maximum value of the luminance component determined according to the bit depth in the image (the picture unit in this example), the minimum value and the maximum value of the chrominance component, or the like are set as the information on the pixel value range.

Further, when the pixel value adjustment method 54 based on the pixel value range constituting the actual image is selected with reference to the syntax element (adaptive_sample_range_flag), syntax elements for luma_lower_bound, luma_upper_bound, chroma_lower_bound[i], and chroma_upper_bound[i] (i is an index value of the chrominance component in this example) are defined in the image (the picture unit in this example) as the information on the pixel value range. By the syntax elements defined as described above, the minimum value and the maximum value of the luminance component, the minimum value and the maximum value of the chrominance component, or the like may be set as the information on the pixel value range. Even in other units (a slice, a tile, a block, and the like), a syntax element for the information on the pixel value range (the minimum value, the maximum value, and the like in this example) may be defined. A syntax element defined according to the color format, or the like may be partially changed for application.

In one or more units (a picture, a slice, a tile, a block, and the like in this example), the information on the pixel value range constituting the actual image may be generated. The pixel value range of the parent unit may include the pixel value range of the child unit. For example, in the case where the information on the pixel value range is generated in two or more units (a picture, and a slice in this example), where the minimum value and the maximum value of the parent unit (a picture in this example) are denoted by minH and maxH, respectively, and where the minimum value and the maximum value of the child unit (a slice in this example) are denoted by minL and maxL, respectively, minH may be equal to or less than minL and maxH may be equal to or greater than maxL. In the case where the parent unit (a picture in this example) includes two or more child units (two slices within the picture in this example), where the minimum value and the maximum value of the parent unit are denoted by minH and maxH, respectively, where the minimum value and the maximum value of a first child unit (the slice in this example) are denoted by minL1 and maxL1, respectively, and where the minimum value and the maximum value of a second child unit (the slice in this example) are denoted by minL2 and maxL2, respectively, minH may be equal to or less than minH1 or minH2, and maxH may be equal to or greater than maxH1 or maxH2. The information on the pixel value range of the parent unit may be generated on the basis of the information on the pixel value range determined by the bit depth. The information on the pixel value range of the child unit may be generated on the basis of the information on the pixel value range of the parent unit. Regarding the information on the pixel value range, additional syntax elements other than the minimum value and the maximum value may be defined.

In the meantime, information indicating the pixel value range constituting the actual image may include the minimum value and the maximum value in the pixel value range. Herein, regarding the information on the pixel value range, information related to an original value (the minimum value and the maximum value themselves) may be generated without prediction. Alternatively, through prediction, information related to a difference value (difference values between prediction values, determined through prediction with respect to the minimum value and the maximum value, and the actual minimum value and the actual maximum value) may be generated. Also, information related to a prediction value used for prediction may be generated. The above-described information may be represented by a combination of one or more factors.

Information related to the original value may be divided into a lossless original value and a lossy original value. The lossless original value may be a value representing the information on the pixel value range of the image as it is, and the lossy original value may be a value having an allowed error range by the encoding/decoding setting with respect to the information on the pixel value range of the image. In the case of the lossy original value, the error range information may be subjected to implicit or explicit processing. In the case of the implicit processing, the error range information may be generated according to a preset condition without generating a related syntax element. In the case of the explicit processing, the error range information may be generated through generation of the related syntax element.

Information related to the difference value may be a difference value between the information (for example, the maximum value and the minimum value) on the pixel value range constituting the actual image and the information (for example, the prediction value for the maximum value, and the prediction value for the minimum value) on the pixel value range obtained through prediction, or may be a pixel value generated on the basis of the information on the pixel value range obtained through prediction. The difference value may be divided into a signed difference value or an unsigned difference value. According to the characteristic of the difference values, syntax element settings (the binarization method, or the like in this example) may be determined.

Information related to the prediction value may be information that is expected to be similar to all or a part of components (for example, the maximum value, the minimum value, and the like) constituting the range of pixel values that constitute the actual image of the image. Therefore, examples of the information related to the prediction value may include a pixel value range of at least one image in which encoding/decoding is completed, another pixel value range in which encoding/decoding is completed previously, a pixel value range of another color component, a prediction value present in the encoder/decoder, and the like. Herein, the preset prediction value may be variable depending on the bit depth.

Information used for prediction may be subjected to implicit or explicit processing according to the encoding/decoding setting. In the case of the implicit processing, prediction related information may be generated according to a preset condition without generating a related syntax element. In the case of the explicit processing, the prediction related information may be generated through generation of the related syntax element, and may be used to predict information on the original value through the information.

The information related to the difference value and the information related to the prediction value may be subjected to context-adaptive binary arithmetic coding (CABAC) through various binarization methods (the binarization methods described in the present invention and other methods) according to the encoding/decoding setting, and may be subjected to context modeling on the basis of various types of information described above (considering context information in this example).

Figure 7:
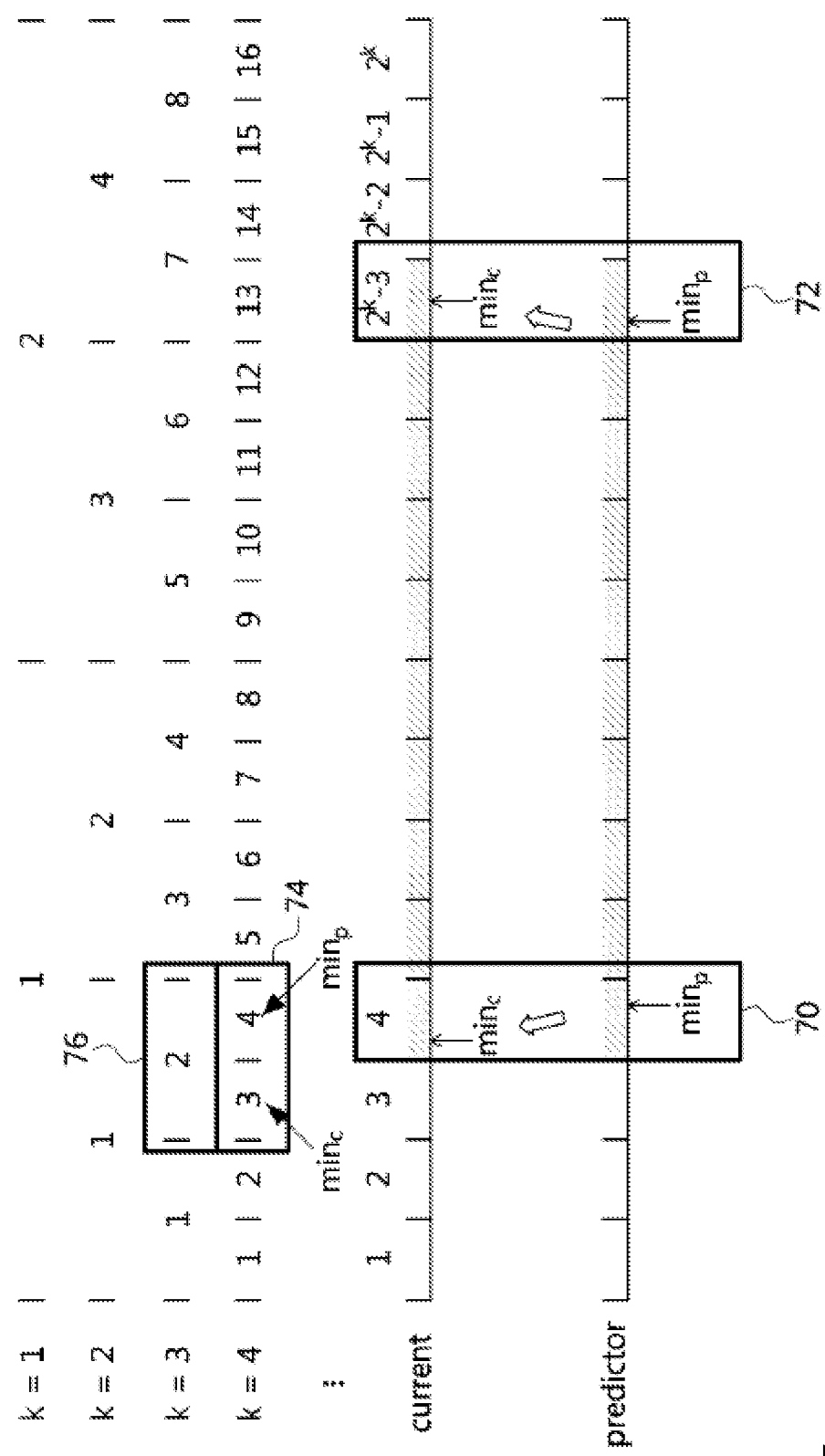
FIG. 7 is an exemplary diagram illustrating a method of generating information on a pixel value range constituting an actual image.

FIG. 7 is an exemplary diagram illustrating a method of generating information on a pixel value range constituting an actual image.

As a first embodiment, the information on the pixel value range constituting the actual image may be generated according to the original value without prediction. For example, the minimum value (minc) and the maximum value (maxc) of the pixel values constituting the current image may be represented by n bits through fixed length binarization according to the bit depth (defined by n bits), and the maximum value and the minimum value represented by n bits may be set as the information on the pixel value range constituting the actual image.

However, in the information on the pixel value range according to the first embodiment, the values indicating the minimum value (minc) and the maximum value (maxc) may be represented differently from the minimum value and the maximum value of the pixel values for the actual image. For example, in the case where the minimum value (minc) and the maximum value (maxc) of the pixel values constituting the actual image are 10 and 240, respectively, the minimum value (minc) of the pixel values constituting the actual image may be represented into 10 as it is. However, the maximum value (maxc) of the pixel values constituting the actual image may be represented by the difference value (the difference value of 15 between 240 and 255) between the maximum value (255 based on 8 bits) of the pixel values represented by the bit depth and the maximum value (maxc) of the pixel values constituting the actual image. In summary, the maximum value, which is a value obtained in ascending order in the entire range (0 to 255) obtained on the basis of the bit depth, may be represented by a value obtained in descending order. The information represented in this manner may be transmitted to the decoding apparatus, being included in the bitstream. The decoding apparatus may parse the received information to reconstruct the information on the pixel value range according to the first embodiment. Herein, when the maximum value of the pixel values constituting the actual image is represented by the above-described difference value (herein, 15), the reconstructed difference value (herein, 15) is subtracted from the maximum value (255 based on 8 bits) of the pixel values represented by the bit depth so that the maximum value (herein, 240) of the pixel values constituting the actual image is obtained.

As a second embodiment, the information on the pixel value range constituting the actual image may be represented by information on a band to which the maximum value (maxc) and the minimum value (minc) of the pixel values constituting the actual image belong. Specifically, the pixel value range represented by the bit depth may be divided into multiple bands ($2^k$ bands are assumed in this example) determined according to the value of k (predetermined, or the encoding apparatus may generate information explicitly indicating the value of k for transmission to the decoding apparatus). The information indicating the bands to which the maximum value (maxc) and the minimum value (minc) belong may be generated.

Referring to FIG. 7, when the preset value of k is 1, the pixel value range represented by the bit depth is divided into two bands. In the same manner, when the value of k is 2, the pixel value range is divided into 4 bands, and when the value of k is 4, the pixel value range is divided into 16 bands. The pixel value range may be divided into $2^k$ bands. Herein, the maximum value and the minimum value of the actual pixel values constituting the current image may be band 4 and band $2^k$–3 in FIG. 7, respectively. However, the number indicating the band to which the maximum value (maxc) or the minimum value (minc) belongs may be set from 0, or may be set from 1 as shown in FIG. 7. Further, the information indicating the band to which the minimum value belongs may be determined to be band 4 as shown in FIG. 7. However, the information indicating the band to which the maximum value belongs may be determined to be band $2^k$–3 as shown in FIG. 7, and may also be determined to be the difference value (herein, 3) between the total number ($2^k$) of bands and the band $2^k$–3 to which the maximum value belongs.

Therefore, when the encoding apparatus transmits the information indicating a band to which the maximum value (maxc) and the minimum value (minc) belong, the decoding apparatus may find the bands to which the maximum value (maxc) and the minimum value (minc) belong, on the basis of the received information. Herein, the encoding apparatus may additionally generate, for transmission, information indicating the position of the maximum value (maxc) or the minimum value (minc) within the band to which the maximum value (maxc) or the minimum value (minc) belongs, or may not generate additional information.

In the case (the lossy original value) where the encoding apparatus does not generate additional information (position information within the band), the decoding apparatus may determine the maximum value and the minimum value as a representative value representing the band to which the maximum value (maxc) or the minimum value (minc) belongs. Herein, the representative value may be a value implicitly set for each band in advance, may be a preset distance from the maximum value or the minimum value constituting the corresponding band, or may be the maximum value or the minimum value constituting the corresponding band. Further, the representative value of the band to which the minimum value (minc) belongs may be set to be the lowest of the pixel values constituting the band. The representative value of the band to which the maximum value (maxc) belongs may be set to be the highest of the pixel values constituting the band.

In the case (the lossless original value) where the encoding apparatus generates additional information (position information within the band), the decoding apparatus may utilize the position information within the band of the minimum value or the maximum value to accurately specify the pixel value within the band without loss. Herein, the additional information (the position information within the band) may be set to be the remainder obtained by dividing the maximum value or the minimum value by the width (interval) of the band. Specifically, for example, when the maximum value is 50 and the width of the band to which the maximum value of 50 belongs is 14, a remainder of 8 obtained by dividing 50 by 14 is generated as additional information. Herein, the information, which include additional information, on the pixel value range (in this example, the lossless original value: minc, maxc) may be transformed into the information on the pixel value range in which the above-described additional information is not generated according to the setting of the lossy original value.

As a third embodiment, on the basis of the information on the pixel value range in which encoding/decoding is completed among the information on the pixel value range according to the first embodiment, information on the remaining pixel value range may be generated. For example, the maximum value (maxc) of the pixel values constituting the current image may be determined as the prediction value for the minimum value (minc) of the pixel values constituting the current image. Therefore, although the encoding apparatus encodes the maximum value as it is, the minimum value may be transmitted to the decoding apparatus by encoding the difference value from the maximum value. The decoding apparatus may decode the maximum value first, and may add the decoded maximum value and the difference value obtained by parsing the received information, thereby obtaining the decoded minimum value. Conversely, the minimum value of the pixel values constituting the current image may be determined as the prediction value for the maximum value of the pixel values constituting the current image, and may be encoded or decoded in a manner that corresponds to the above.

In the meantime, the bit length for representing the difference value (maxc-minc) between the maximum value (maxc) and the minimum value (minc) constituting the current image may be determined by performing variable length binarization on the basis of the difference value (diff) between the minimum value (or the maximum value) in which encoding/decoding is completed and the maximum value (or the minimum value) represented by the bit depth. Specifically, when the difference value (diff) between the minimum value (or the maximum value) in which encoding/decoding is completed and the maximum value (or the minimum value) represented by the bit depth satisfies Expression 1 below, binarization is performed using the value of k which satisfies Equation 1 below, as the bit length.

$$2^{k-1} \le \text{difference value(diff)} < 2^k \qquad \text{[Expression 1]}$$

For example, when the bit depth is 8 bits and the minc is 122 (in this example, maxc is 200), the difference value from the maximum value (255 in this example) represented by the bit depth is 133, and k satisfying this in Expression is 8. Therefore, the difference value (|maxc−minc|, in this example, 78) between the maximum value and the minimum value of the pixel values constituting the current image may be generated into 8 bits (01001110 in this example) determined on the basis of the difference value between minc and the maximum value represented by the bit depth. By adding |maxc−minc| to minc in which encoding/decoding is previously completed, maxc may be reconstructed. As another example, when maxc is 120 (in this example, minc is 10), the difference value from the minimum value (0 in this example) represented by the bit depth is 120 and k satisfying this in the above Expression is 7. Therefore, the difference value (|maxc−minc|, in this example, 110) of the pixel value range may be generated into 7 bits (1101110 in this example) determined on the basis of the difference value between maxc and the minimum value represented by the bit dept. By subtracting |maxc−minc|, from maxc in which encoding/decoding is previously completed, minc may be reconstructed. The binarization in this example is just an example, and other binarization methods may also be applied.

As a fourth embodiment, information on the pixel value range of the current image may be generated on the basis of the information on the pixel value range in which encoding/decoding is completed according to the second embodiment. For example, the information on the band to which the maximum value constituting the current image belongs according to the second embodiment may be used as a prediction value for the information on the band to which the minimum value constituting the current image belongs. Conversely, the information on the band to which the minimum value constituting the current image belongs may be used as a prediction value for the information on the band to which the maximum value constituting the current image belongs. Herein, the bit length representing the difference value between the derived information on the band and the prediction value for the information on the band may be determined by variable length binarization based on the difference value between the information on the band to which the maximum value (or the minimum value) belongs and the minimum value (or the maximum value) among the bands (for example, 1 to $2^k$) indicating the bands resulting from the division as shown in FIG. 7.

As a fifth embodiment, information on the pixel value range of the current image may be generated using, as a prediction value, information on the pixel value range of at least one image in which encoding/decoding is completed. Referring back to FIG. 7, by using, as the prediction values, the minimum value (minp) and the maximum value (maxp) of the pixel values constituting at least one other image (predictor) in which encoding/decoding is completed, the minimum value (minc) and the maximum value (maxc) of the pixel values constituting the current image may be derived.

Further, information on a pixel value range of a first color component (luma component or chroma component in this example) may be used to predict information on a pixel value range of a second color component (chroma component or luma component or another chroma component in this example). Information on the difference value may be provided under a condition not exceeding a preset range.

Further, as shown in FIG. 7, information on a band to which the minimum value (minc) and the maximum value (maxc) of the current image belong may be derived using, as a prediction value, information on a band to which the minimum value (minp) and the maximum value (maxp) of at least one other image (predictor) in which encoding/decoding is completed belong. Particularly, when the information on a band to which the maximum value and the minimum value of at least one other image belong is the same as the information on a band to which the maximum value and the minimum value of the current image belong, it is not necessary to transmit band information indicating a band to which the maximum value and the minimum value of the pixel values constituting the current image belong. In this case, the decoding apparatus may obtain, from at least one other image in which encoding/decoding is completed, the band information indicating a band to which the maximum value and the minimum value of the pixel values constituting the current image belong. Accordingly, the encoding apparatus may generate only information on a position of the maximum value or the minimum value within the band except for the band information, for transmission to the decoding apparatus.

Further, from the image in which encoding/decoding is completed, information on whether prediction of the information on the pixel value range is performed may be additionally generated. For example, when the information on a band to which the maximum value and the minimum value of the current image belong is the same as the information on a band to which the maximum value and the minimum value of the other image belong, the encoding apparatus additionally generates a flag (or syntax element) indicating that they are the same (or indicating that it is predictable). The decoding apparatus receives the flag additionally generated by the encoding apparatus. When the received flag is activated (for example, 1), the information on the pixel value range (the information on a band to which the maximum value and the minimum value belong, and the information on the position within the band) constituting the image in which encoding/decoding is completed is used to perform prediction so that the band information of the current image is obtained. The position information within the band of the current image may be obtained by being received from the encoding apparatus.

Referring to FIG. 7, the entire pixel value range (0 to 255) set when the bit depth is 8 bits may be divided into $2^k$ bands. Herein, the maximum values and the minimum values of the current image and the other image (predictor) in which encoding/decoding is completed may belong to one among the bands resulting from the division. Referring to reference numeral 70 in FIG. 7, it is found that the minimum value (minc) of the pixels constituting the current image belongs to band 4 and the minimum value (minp) of the pixels constituting the other image belongs to band 4. Referring to reference numeral 72 in FIG. 7, it is found that the maximum value (maxc) of the pixels constituting the current image belongs to band $2^k$–3 and the minimum value (maxp) of the pixels constituting the other image belongs to band $2^k$–3. Like this, when the maximum/minimum value of the pixels constituting the current image belongs to the same band as the maximum/minimum value of the pixels constituting the other image, the bands (namely, the band information) to which the maximum value and the minimum value of the current image belong are determined (or predicted) through a band to which the maximum value and the minimum value of the other image belong. Therefore, the encoding apparatus may generate a 1-bit value indicating that prediction is possible through band information of the other image, and may generate the information (4 bits in this example) on the position within the band to which the maximum/minimum value of the current image belongs so as to check the information on the position within the band. Herein, the information on the position within the band may be determined by a remainder obtained by dividing the maximum value or the minimum value of the current image by the number of bands.

As a more specific example, when k is 4, the pixels are divided into $2^4$ bands (herein, one band interval is $2^4$). When the minimum pixel value (minc) and the maximum pixel value (maxc) of the current image are 55 and 211, respectively, it is assumed that the values are included in band 4 and band 14, respectively. When minp and maxp obtained from the other image are 49 and 221, respectively, it is assumed that the values are included in band 4 and band 14, respectively (in other words, it is the case where the band information of the other image is the same as the band information of the current image). Under this assumption, since the information on bands to which the maximum value and the minimum value of the current image belong is predicted from the information on bands to which the maximum value and the minimum value of the other image belong, bands to which minc and maxc belong is checked from band 4 and band 14 to which minp and maxp belong, respectively. Therefore, minc and maxc (8 bits as 00110111 and 11010011 when sending 55 and 211 as they are) of the current image may be represented only by the information on the positions within the bands (xxxx0111 and xxxx0011 in this example; lower 4 bits of 8 bits), excluding the band information (0011xxxx and 1101xxxx in this example; higher 4 bits of 8 bits correspond to the band information).

As another example, when the bit depth is 8 bits and k is 4 (in this example, 16 bands), it is assumed that minc and maxc of the current image, which are 8 and 136, are included in band 1 and band 9, respectively, and minp and maxp, which are 29 and 140, are included in band 2 and band 9, respectively. In the case where the information on the pixel value range of the current image is predicted from the other image and is predicted for each element, minc occurs in a band different from the band to which minp belongs, so that prediction is not performed, and maxc belongs to the same band as maxp, so that prediction is performed. Herein, minc generates the information on the pixel value range by using the original value (00001000, 8, in this example) or in another way, and maxc occurs in band 9 to which maxp belongs. Thus, by using the information on the position within the band (in this example, 8 (a remainder obtained by dividing the maximum value of 136 by 16, the number of bands, turns into the information on the position within the band), xxxx1000), the information on the pixel value range may be generated. That is, regarding the minimum value (minc) of the pixel values constituting the current image, information indicating the minimum value (minc) may be generated using a flag (applied for each element) of 0 (1 bit, 0 indicates impossibility of prediction) indicating prediction and the original value of 00001000 (8 bits). Regarding the maximum value (maxc) of the pixel values constituting the current image, a prediction flag (applied for each element) of 1 (1 bit, 1 indicates possibility of prediction) and the information on the position within the band, 1000, (8, represented by 4 bits) may occur.

In the meantime, even when the band to which the maximum value and/or the minimum value of the pixel values constituting the current image belong is different from the band to which the maximum value and/or the minimum value of the pixel values constituting the other image in which encoding/decoding is completed belongs, the bands resulting from the division are changed so that it is possible to derive the band information through prediction. Referring to reference numeral 74 in FIG. 7, in the case where the number of bands resulting from the division is 16 ($2^4$, k=4), it is found that the minimum value of the pixel values constituting the current image belongs to band 3 and the minimum value of the pixel values constituting the other image in which encoding/decoding is completed belongs to band 4. That is, in reference numeral 74, the band to which the minimum value of the pixel values constituting the current image belongs is different from the band to which the minimum value of the pixel values constituting the other image in which encoding/decoding is completed belongs. However, herein, when the number of bands resulting from the division is changed into $2^3$ (8, k=3), it is found that the minimum value of the current image and the minimum value of the other image belong to the same band (band 2) as shown in reference numeral 76. Therefore, by changing (or lowering) the number of bands resulting from the division, prediction using the band information of the other image is possible. That is, the encoding apparatus may generate information commanding to reduce the value of the variable k, which determines the number of bands resulting from the division, by 1, wherein the information is additional included in a flag indicating whether prediction is possible.

As a specific example, it is assumed that when the bit depth is 8 bits and k is 4 (16 bands), the same pixel value and the same band are provided as minc, maxc, minp, and maxp in the above example. In the case where the information on the pixel value range of the current image is predicted from the other image and prediction is performed for each element through a band adjustment process, minc occurs in a band different from the band to which minp belongs, so that immediate prediction (in this example, k is 4) may not be performed; maxc belongs to the same band as maxp, so that prediction may be performed. The maxc occurs in band 9 to which maxp belongs and the rest of information thereon (in this example, 8(136% 16), xxxx1000) is used to generate the pixel value range; minc is included in band 1 (when k is 3) through the process of adjusting the value of k (in this example, k is adjusted from 4 to 3); and minp is included in band 1 (when k is 3). Since minc belongs to the same band as minp, prediction is performed, and information (in this example, 8(8% 32), xxx01000) on the position within the band may be used to generate the information on the pixel value range. That is, as a prediction flag of minc, a value of 01 (2 bits) and the remaining value of 01000 (5 bits) may be generated, and as a prediction flag of maxc, a value of 1 (1 bit) and the remaining value of 1000 (4 bits) may be generated. Herein, an additional prediction flag based on a bit may occur in a particular situation (in this example, the case where k is the initial value and is not predicted or the case where the updated k is not predicted, 0), which may occur up to a preset boundary value (in this example, it is assumed that the initial k is 4 and a boundary value is 2; herein, a possible prediction flag has a value of 1 (when k is 4, prediction is possible), 01 (when k is 3, prediction is possible), 001 (when k is 2, prediction is possible), 000 (prediction is not performed)). The settings such as the value of k, the process of adjusting the value of k, the boundary value of the value of k, and the like in the above embodiment may be determined according to the encoding/decoding setting, and related information may be transmitted, being included in a bitstream.

Figure 8:
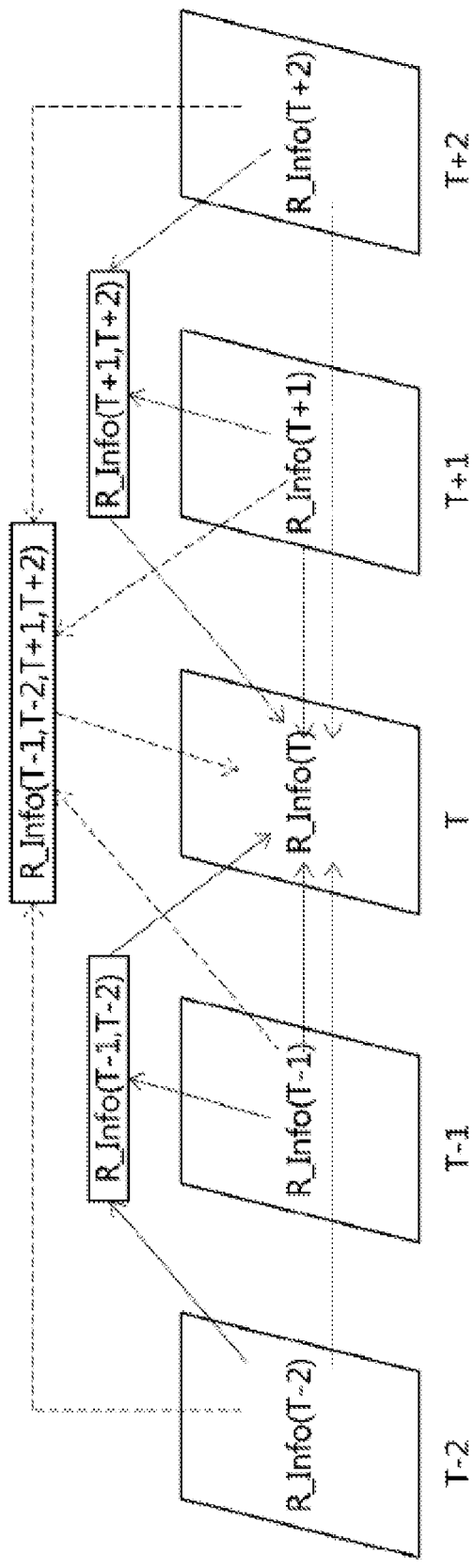
FIG. 8 is an exemplary diagram illustrating a method of obtaining information on a pixel value range constituting a current image by using at least one image in which encoding/decoding is completed.

FIG. 8 is an exemplary diagram illustrating a method of obtaining information on a pixel value range constituting a current image by using at least one image in which encoding/decoding is completed.

Referring to FIG. 8, T−2 and T−1 denote images in which encoding/decoding is completed before the current image (herein, a description is given targeting a picture), and T+1 and T+2 denote images in which encoding/decoding is completed after the current image. Further, the expression R_Info may refer to information on the pixel value range constituting the corresponding image.

According to an embodiment of the present invention, the information on the pixel value range of the current picture may be referenced in at least one image (in this example, T−1, T−2) in which encoding/decoding is completed before the current picture, may be referenced in at least one image (in this example, T+1, T+2) in which encoding/decoding is completed after the current picture, or may be referenced in at least one image (in this example, T−2, T−1, T+1, T+2) in which encoding/decoding is completed before or after the current picture. The images referenced to predict the information on the pixel value range may be images included in reference picture lists L0 and L1 for inter prediction, may be images positioned in the same GOP as the current image, or may be images having the same or lower temporal layer (TemporalID) than that of the current image. The referenced image may be at least one image, which may be defined according to the setting of the encoder/decoder. A preset image may be referenced. Alternatively, after a candidate group of one or more images is configured, an image to be referenced may be determined, and corresponding selection information may be generated.

Further, when reference for prediction of the information on the pixel value range is impossible, another method (following the previous embodiment or an additional method) in which the information on the pixel value range is not predicted from the other image may be used. For example, the first image of GOP, an image (in this example, an intra random access point (TRAP) picture) for random access, or the like may correspond thereto.

The expression R_Info (A) denotes information on a pixel value range of one image, which includes information on the minimum value and the maximum value of the image A so that prediction values for the minimum value and the maximum value of the current image may be generated. The expression R_Info (A, B, . . . ) denotes information on a pixel value range of two or more images (A, B, and the like), which includes information on a representative minimum value and a representative maximum value so that prediction values for the minimum value and the maximum value of the current image may be generated. The representative minimum value and the representative maximum value may be derived using a method, such as an average, a weighted sum, a median, or the like of the minimum value and the maximum value. Alternatively, the prediction value of the minimum value and the maximum value may be derived through estimation according to slope information or variation in the information on the pixel value range of consecutive images. The information on the pixel value range may be obtained from a pixel value before encoding/decoding of each image is performed.

Whether to perform prediction may be determined on the basis of the information on the pixel value range of the image in which encoding/decoding is completed. For example, whether to predict the information on the pixel value range of the current image from two or more images may be determined according to similarity in the information on the pixel value range of the images, specifically, a process of checking similarity between the minimum value and the maximum value of an image A and the minimum value and the maximum value of an image B (in this example, comparison based on band information).

For example, in the case where the bit depth is 8 bits and k is 4, when the minimum value (minA) and the maximum value (maxA) of the pixel values constituting the image A are 40 and 200, respectively, the values are included in band 3 and band 13, respectively; and when the minimum value (minB) and the maximum value (maxB) of the pixel values constituting the image B are 35 and 206, respectively, the values are included in band 3 and band 13, respectively. In this case, it is determined that there is similarity in the pixel value range of the images and that there will be similar similarity in the current image, so that prediction of the information on the pixel value range (in this example, the entire information on the pixel value range, applied to elements together) may be performed.

For example, in the case where the bit depth is 8 bits and k is 4, when the minimum value (minA) and the maximum value (maxA) of the pixel values constituting the image A are 40 and 200, respectively, the values are included in band 3 and band 13, respectively; and when the minimum value (minB) and the maximum value (maxB) of the pixel values constituting the image B are 50 and 205, respectively, the bands are included in band 4 and band 13, respectively. In this case, it is determined that there is partial similarity (max) in the pixel value range of the images and that there will be similarity in the partial pixel value range of the current image, so that prediction of the information on the pixel value range (in this example, a part of the information on the pixel value range, applied for each element) may be performed.

For example, in the case where the bit depth is 8 bits and k is 3, when the minimum value (minA) and the maximum value (maxA) of the pixel values constituting the image A are 40 and 200, respectively, the values are included in band 2 and band 7, respectively; and when the minimum value (minB) and the maximum value (maxB) of the pixel values constituting the image B are 10 and 255, respectively, the values are included in band 1 and band 8, respectively. In this case, it is determined that there is no similarity in the pixel value range of the images and that there will be no similarity in the pixel value range of the current image, so that prediction of the information on the pixel value range may not be performed.

In the above embodiment, as an example of the process of checking similarity for prediction of the information on the pixel value range, band information comparison is used, but including this, various methods and processes may be used to determine whether to perform prediction.

In the meantime, as shown in FIG. 5, through the pixel value adjustment 52 based on the bit depth or the pixel value adjustment 54 based on the pixel value range constituting the actual image, the pixel value range including the minimum value and the maximum value of the pixel values may be changed (determined or defined), and additional information on the pixel value range may also be changed (determined or defined). For example, the maximum value and the minimum value of the pixel values constituting the actual image may be changed, and the median value of the pixel values constituting the actual image may also be changed.

In FIG. 5, in the pixel value adjustment process 52 based on the bit depth, minI may denote the minimum pixel value of the image, maxI may denote the maximum pixel value of the image, I may denote the color component, and medianI may denote the median pixel value of the image. The minI may be 0, the maxI may be (1<<bit_depth)−1, and the medianI may be 1<<(bit_depth−1). The median may be obtained in other forms including the above example according to the encoding/decoding setting. The median value is only a term for description of the present invention, and may be one piece of information indicating information on a pixel value range that may be changed (determined or defined) according to the pixel value adjustment process in an image encoding/decoding process.

In FIG. 5, in the pixel value adjustment processes 54a and 54b based on the actual pixel value range constituting the image, minI may denote the actual minimum pixel value (or approximate value) of the image, maxI may denote the actual maximum pixel value (or approximate value) of the image, and medianI may denote the actual median pixel value (or approximate value) of the image. The medianI may be an average of the antual pixel values of the image, may be a value positioned at the middle when the pixels of the image are arranged, or may be a value obtained according to the information on the pixel value range of the image. The medianI may be derived from at least one among minI and maxI. That is, the medianI may be one pixel value that is present within the pixel value range of the image.

For example, the medianI may be a value, such as (minI+maxI)/2 or (minI+maxI)>>1, (minI+maxI+1)/2, (minI+maxI+1)>>1, or the like, obtained according to the information (in this example, minI and maxI) on the pixel value range of the image. The median may be obtained in other forms including the above example according to the encoding/decoding setting.

Regarding the medianI, including the case of generating implicit information in the above example, explicit information such as the minI and the maxI may be generated for encoding/decoding. For example, regarding luma_median_value and chroma_median_value[i], a syntax element for the median value of the luminance component and the median value of the chrominance component may be defined using the information on the pixel value range based on a picture, and may be defined as luma_lower_bound, luma_upper_bound, chroma_lower_bound, and chroma_upper_bound[i]. Even in other units (a slice, a tile, and the like), the syntax element may be defined. The process and setting for the information on the pixel value range described in the embodiments related to the information on the pixel value range may be applied to the medianI in the same or similar manner.

Hereinafter, an embodiment related to the median value will be described.

For example, in the case where the default bit depth is 8 bits, where the pixel value adjustment process (in this example, the median value is 128, based on 8 bits) based on the bit depth is selected, and where the current block is positioned at the upper left of the image (the picture in this example), the neighboring blocks (or the reference blocks: in this example, left, lower left, upper left, upper, and upper right) in which encoding/decoding is completed are not present, so that the reference pixel may be filled with the median value (in this example, 1<<(bit_depth−1), 512). The intra prediction process may be performed using the reference pixel according to the prediction modes (in this example, a directional prediction mode: diagonal down left).

For example, in the case where the default bit depth is 8 bits, where the pixel value adjustment process (54a in FIG. 5, in this example, the minimum value of 10, the maximum value of 190, the median value of 100 under the setting (average) in which derivation takes place from the minimum value and the maximum value, and based on 8 bits) based on the pixel value range constituting the actual image is selected, and where the position of the current block is the first block within the image (the slice in this example), the neighboring blocks (in this example, left, lower left, upper left, upper, and upper right) to be used in encoding/decoding are not present, so that the reference pixel may be filled with the median value (100 in this example). The intra prediction process may be performed using the reference pixel according to the prediction mode (in this example, a non-directional prediction mode: DC).

For example, in the case where the default bit depth is 10 bits, where the pixel value adjustment process (54b in FIG. 5, in this example, the median value is 600, and a related syntax element is present) based on the pixel value range constituting the actual image is selected, and where the position of the current block is the first block within the image (the tile in this example), the neighboring blocks (in this example, left, lower left, upper left, upper, and upper right) to be used in encoding/decoding are not present, so that the reference pixel may be filled with the median value (600 in this example). The intra prediction process may be performed using the reference pixel according to the prediction mode (in this example, a directional prediction mode: Vertical).

For example, in the case where the default bit depth is 10 bits, where the pixel value adjustment process (54a in FIG. 5, in this example, the median value is 112, and a related syntax element is present) based on the pixel value range constituting the actual image is selected, where encoding/decoding is completed, but the setting in which availability is determined according to the encoding modes (intra prediction/inter prediction) of the block, or the like is activated (in this example, when the encoding mode of the corresponding block is intra prediction, use as the reference pixel of the current block is possible; when the encoding mode of the corresponding block is inter prediction, the use is impossible; and when the setting is deactivated, (use as the reference pixel of the current block is possible regardless of the encoding mode of the block), and where the current block is positioned at the left of the image, the neighboring blocks (in this example, left, lower left, and upper left) to be used in encoding/decoding are not present. The neighboring blocks (in this example, upper, and upper right) to be used in encoding/decoding are present, but are not allowed to be used by the setting because the encoding mode is inter prediction. Therefore, the reference pixel may be filled with the median value (112 in this example). That is, since there is no available reference pixel, it may be filled with the median value of the pixel value range of the image. The intra prediction process may be performed using the reference pixel according to the prediction mode (in this example, the non-directional prediction mode: Planar).

In this embodiment, the examples are described in which the pixel value adjustment process is performed according to the characteristics of the boundary between the current block and the neighboring block, the position of the current block, whether the neighboring block is encoded/decoded, the encoding mode of the neighboring block, the setting of using the reference pixel depending on the encoding mode of the block, and the like. Specifically, described is an example of whether the intra prediction module uses information on a pixel value range according to the pixel value adjustment process, according to the result of constructing a reference pixel by a reference pixel construction module (or construction step) (in the above example, when there is no available reference pixel, the reference pixel is filled with the median value of the image and thus is changed into an available reference pixel). Specifically, described is an example where in a prediction pixel generation process, pixel value adjustment may be performed according to the information on the pixel value range (in this example, min and max), and in a reference pixel generation process, pixel value adjustment may be performed according to the information on the pixel value range (in this example, the median). In the above embodiment, the various cases related to the median value in the prediction module have described, but these may be included in other elements for image encoding/decoding. Also, no limitation to the embodiment is imposed, and modification and expansions into various cases are possible.

Figure 9:
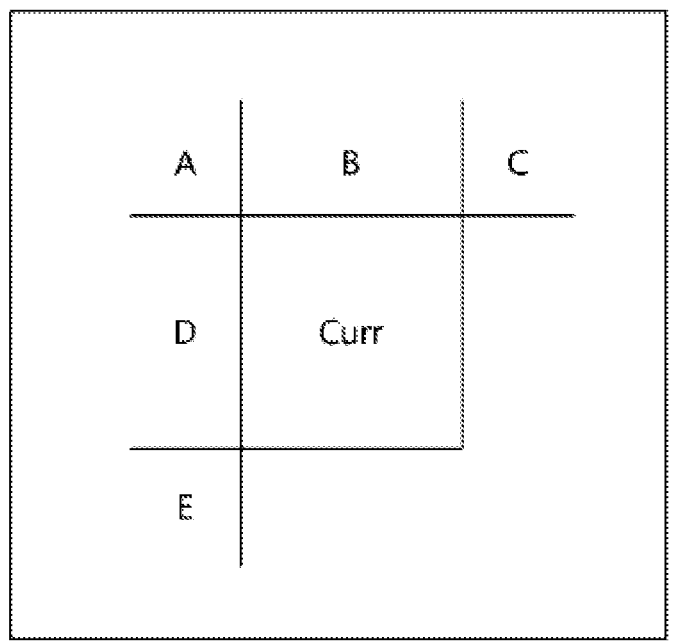
FIG. 9 is an exemplary diagram illustrating a target block for intra prediction and its neighboring block.

FIG. 9 is an exemplary diagram illustrating a target block for intra prediction and its neighboring block.

In an image encoding method and apparatus according to an embodiment of the present invention, intra prediction may include a reference pixel construction step, a reference pixel filtering step, a prediction block generation step, a prediction mode determination step, and/or a prediction mode encoding step. Further, the image encoding apparatus may include a reference pixel construction module, a reference pixel filtering module, a prediction block generation module, and/or a prediction mode encoding module, which perform the reference pixel construction step, the reference pixel filtering step, the prediction block generation step, the prediction mode determination step, and the prediction mode encoding step, respectively. Some of the above-described processes may be omitted, other processes may be added, or the order may be changed into another order.

Referring to FIG. 9, the reference pixel construction module may construct pixels that belong to neighboring blocks (A, B, C, D, and E) with the current block (Curr, a block in an M×N size) in the center and are adjacent to the current block (Curr), as reference pixels for intra prediction. Herein, the reference pixels may be managed through a temporary memory (for example, a 1D or 2D array, and the like), and may be generated and removed for every intra prediction process of the block. The size of the temporary memory may be determined according to the size of the current block and the configuration of reference pixels.

In order to construct the reference pixels, the reference pixel construction module may check whether the reference pixels (or neighboring blocks) are available. When a part of the reference pixels (or at least one block among A to E) is unavailable, an available reference pixel is used (for example, methods such as extrapolation when the available reference pixels are present only in one direction, extrapolation in a clockwise/counterclockwise direction or interpolation when the available reference pixels are present in both directions, or the like) to generate an unavailable reference pixel. When all of the reference pixels (or all blocks A to E) are unavailable, the reference pixel is filed with the median value as described above, or other various methods described in the present are used to generate the reference pixel.

Herein, the availability of the neighboring block may be determined according to whether the corresponding block is encoded, whether the corresponding block is present outside of the picture boundary, whether the corresponding block belongs to a different slice/tile than the current block, whether constrained intra prediction setting (for example, constrained_intra_pred_flag, whether to use the neighboring block as the reference pixel is determined according to the encoding mode of the neighboring block; in the case of a value of "1", when the encoding mode of the neighboring block is intra prediction, it is possible to use the neighboring block, and when it is inter prediction, it is impossible to use the neighboring block; in the case of a value of "0", it is possible to use the neighboring block regardless of the encoding mode of the neighboring block) is performed, or the like. For example, in the case where encoding of the neighboring block is completed, where the neighboring block is present within the picture, where the neighboring block belongs to the same slice/tile as the current block, and where the constrained_intra_pred_flag has a value of "1", when the encoding mode refers to intra prediction, the neighboring block is available.

The reference pixel construction module may construct reference pixels through Equation 2 below.

$$p^*[x][y] = \text{ref\_sample}\ (p[i][j], \text{blk\_size}, \text{color\_idx}) \qquad \text{[Equation 2]}$$

Referring to Equation 2, the expression p[i] [j] denotes the reference pixel of the block adjacent to the current block (in this example, it is assumed that i and j have ranges, such as i=−1, j=−1~2*blk_size (or blk_size_h)−1, and i=0~2*blk_size (or blk_size_w)−1, j=−1). The expression p*[i] [j] denotes a reference pixel after the reference pixel construction process. The expression ref_sample( ) denotes a function (extrapolation, copying, generation of a median value, and the like are performed) for constructing the reference pixel; the expression blk_size (or blk_size_w, blk_size_h) denotes a block size (or length), which may be M or N; and the expression color_idx denotes the chrominance component.

The reference pixel filtering module may perform filtering on the reference pixel in order to reduce degradation that remains through the encoding process. Herein, the used filter may be a low-pass filter, such as a 3-tap filter [¼, ½, ¼], a 5-tap filter [2/16, 3/16, 6/16, 3/16, 2/16], or the like. Whether to apply filtering may be determined according to the encoding setting (for example, the setting information may be determined by the size, shape, prediction mode of the block, or the like). When filtering is applied, fixed filtering or adaptive filtering is applied.

The reference pixel filtering module may obtain the filtered reference pixel through Equation 3 below.

$$p''[x][y] = \text{ref\_filter}\ (p^*[i][j], \text{blk\_size}, \text{pred\_mode}) \qquad \text{[Equation 3]}$$

Referring to Equation 3, the expression p″[i] [j] denotes the filtered reference pixel; the expression pred_mode denotes the prediction mode of the current block; and the expression ref_filter( ) denotes a function for filtering the reference pixel by using the above-described 3-tap filter, 5-tap filter, or the like. The expression p*[i] [j] denotes the reference pixel constructed according to Equation 2 above.

The prediction block generation module may generate the prediction block according to at least one prediction mode, and may use the reference pixel on the basis of the prediction mode. Herein, the reference pixel may be used in a method, such as extrapolation, or the like, according to the prediction mode; or may be used in a method, such as interpolation, averaging (DC), copying (Copy), or the like. Herein, like HEVC, a prediction mode candidate group may be composed of 33 directional modes (angular modes) and two non-directional mode (DC and Planar). No limitation thereto is imposed, and various configurations (for example, the number of prediction modes, prediction mode candidate group configuration, and the like) may be provided.

Specifically, the prediction block generation module may obtain the prediction block through Equation 4 below.

$$p^f[x][y] = \text{pred\_sample}\ (p''[i][j], \text{blk\_size}, \text{pred\_mode}) \qquad \text{[Equation 4]}$$

Referring to Equation 4, the expression $p^f[x]$ [y] denotes a prediction pixel of the current block (in this example, x and y may have a range of 0 to blk_size−1, or may have a range of 0 to blk_size_w and a range of 0 to blk_size_h, respectively, according to the shape of the current block); and the expression pred_sample( ) denotes a function for generating a prediction block by using the reference pixel according to the intra prediction mode.

A prediction mode determination module performs a process of selecting the optimum mode among multiple prediction mode candidate groups. In general, by using a rate-distortion scheme considering block distortion (for example, distortion of the current block and the reconstructed block, sum of absolute difference (SAD), sum of square difference (SSD), or the like) and the number of bits caused by the corresponding mode, it is possible to determine the optimum mode in terms of encoding cost. The prediction block generated on the basis of the prediction mode determined through the process may be transmitted to the subtractor and the adder.

The prediction mode encoding module may encode the prediction mode selected through the prediction mode determination module. It is possible to encode index information corresponding to the prediction mode in the prediction mode candidate group. Alternatively, it is possible to encode the prediction mode and to encode information thereon (a prediction flag, and information on the remaining modes depending on the result of the prediction). Herein, blocks used in prediction of the prediction mode may be left, upper, upper left, upper right, and lower left blocks with the current block in the center. The prediction mode of the corresponding block may be used as a prediction value for encoding the prediction mode of the current block.

Further, in an image decoding method and apparatus according to an embodiment of the present invention, intra prediction may include a prediction mode decoding step, a reference pixel construction step, a reference pixel filtering step, and/or a prediction block generation step. Further, the image decoding apparatus may include a prediction mode decoding module, a reference pixel construction module, a reference pixel filtering module, and/or a prediction block generation module, which perform the prediction mode decoding step, the reference pixel construction step, the reference pixel filtering step, and the prediction block generation step, respectively. Some of the above-described processes may be omitted, other processes may be added, or the order may be changed into another order.

The reference pixel construction module, the reference pixel filtering module, and the prediction block generation module of the image decoding apparatus perform the same operations as the corresponding modules of the image encoding apparatus, and thus a detailed description will be omitted. The prediction mode decoding module may perform the inverse of the method performed by the prediction mode encoding module.

The above-described various processes (for example, Equations 2 to 4) of the intra prediction module may include the pixel value adjustment (for example, clipping according to min and max, median value input according to the median, and the like) processes according to the information on the pixel value range.

Figure 10:
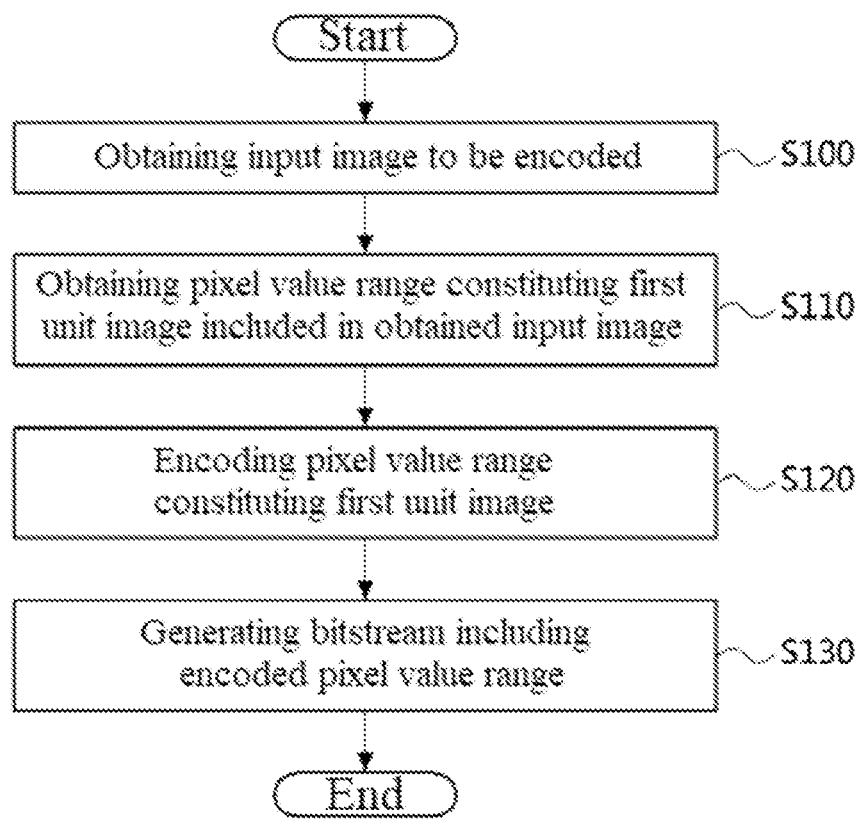
FIG. 10 is a flowchart illustrating an image encoding method using a pixel value range constituting an image according to an embodiment of the present invention.

FIG. 10 is a flowchart illustrating an image encoding method using a pixel value range constituting an image according to an embodiment of the present invention.

Referring to FIG. 10, an image encoding method using a pixel value range constituting an image includes: obtaining an input image to be encoded at step S100; obtaining the pixel value range constituting a first unit image included in the obtained input image at step S110; encoding the pixel value range constituting the first unit image at step S120; and generating a bitstream including the encoded pixel value range at step S130.

Herein, the first unit image may be an image composed of a unit that is one among a picture, a slice, a tile, and a block.

Herein, the encoding at step S120 may include encoding a difference value between the maximum value of the pixel values constituting the first unit image and the maximum pixel value based on the bit depth.

Herein, the encoding at step S120 may include generating band information indicating a band to which the maximum value or the minimum value of the pixel values constituting the first unit image belongs.

Herein, after the generating of the band information, there may be further included generating band position information indicating a position within the band to which the maximum value or the minimum value of the pixel values constituting the first unit image belongs.

Herein, the generating of the band position information may be performed when a representative value for the band to which the maximum value or the minimum value belongs is not preset.

Herein, the representative value may be one among a maximum pixel value, a minimum pixel value, and a median value in the band to which the maximum value or the minimum value belongs.

Herein, the generating of the band information may include: generating the band information on the band to which any one among the maximum value and the minimum value belongs; and generating, by using the generated band information as a prediction value, the band information on the band to which the other one belongs.

Herein, the encoding at step S120 may include: obtaining a pixel value range constituting a different unit image in which encoding is completed; and encoding the pixel value range constituting the first unit image, by using the pixel value range constituting the different unit image as a prediction value.

Herein, the encoding of the pixel value range constituting the first unit image at step S120 may include generating a syntax element indicating whether the pixel value range constituting the different unit image and the pixel value range constituting the first unit image belong to the same band.

Figure 11:
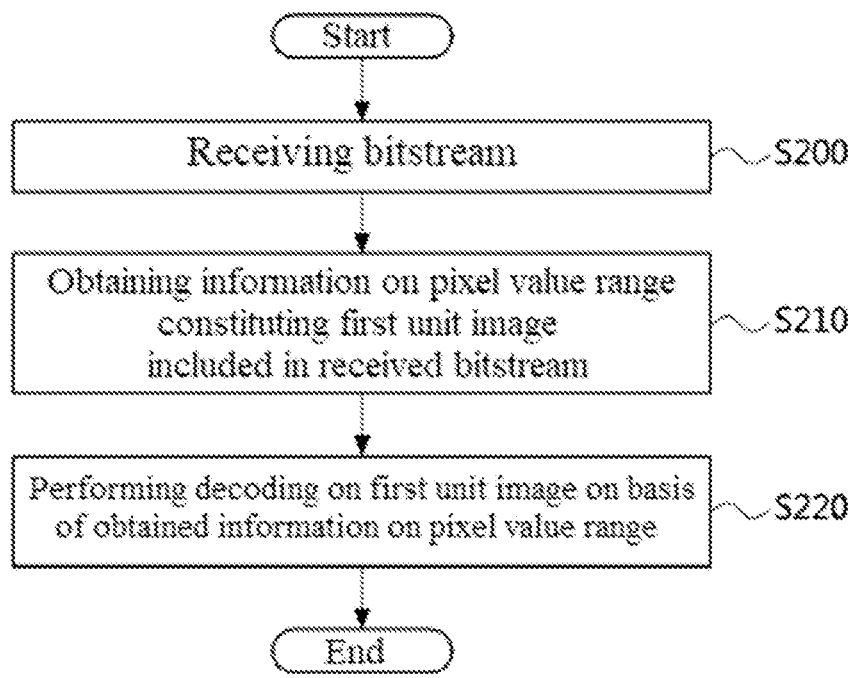
FIG. 11 is a flowchart illustrating an image decoding method using a pixel value range constituting an image according to an embodiment of the present invention.

FIG. 11 is a flowchart illustrating an image decoding method using a pixel value range constituting an image according to an embodiment of the present invention.

Referring to FIG. 11, an image decoding method using a pixel value range constituting an image may include: receiving a bitstream at step S200; obtaining information on the pixel value range constituting a first unit image included in the received bitstream at step S210; and performing decoding on the first unit image on the basis of the obtained information on the pixel value range at step S220.

Herein, the first unit image may be an image composed of a unit that is one among a picture, a slice, a tile, and a block.

Herein, the obtaining of the information on the pixel value range constituting the first unit image at step S210 may include: obtaining, from the bitstream, a difference value between the maximum value of pixel values constituting the first unit image and the maximum pixel value based on the bit depth; and obtaining, on the basis of the difference value, the maximum value of the pixel values constituting the first unit image.

The obtaining of the information on the pixel value range constituting the first unit image at step S210 may include obtaining band information indicating a band to which the maximum value or the minimum value of the pixel values constituting the first unit image belongs.

Herein, after the obtaining of the band information, there may be further included obtaining band position information indicating a position within the band to which the maximum value or the minimum value of the pixel values constituting the first unit image belongs.

Herein, the obtaining of the band position information may be performed when a representative value for the band to which the maximum value or the minimum value belongs is not preset.

Herein, the representative value may be one among a maximum pixel value, a minimum pixel value, and a median value in the band to which the maximum value or the minimum value belongs.

Herein, the obtaining of the band information may include: obtaining the band information on the band to which any one among the maximum value and the minimum value belongs; and obtaining, by using the obtained band information as a prediction value, the band information on the band to which the other one belongs.

Herein, the obtaining of the band information may include: obtaining a pixel value range constituting a different unit image in which decoding is completed; and obtaining the pixel value range constituting the first unit image, by using the pixel value range constituting the different unit image as a prediction value.

Figure 12:
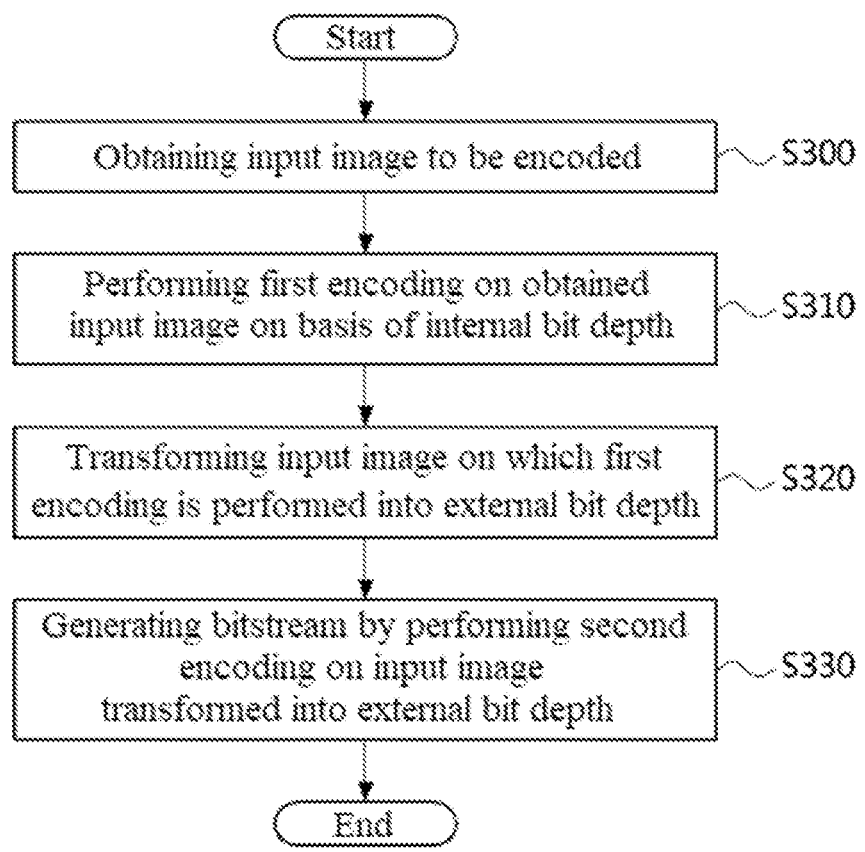
FIG. 12 is a flowchart illustrating an image encoding method using two or more bit depths according to an embodiment of the present invention.

FIG. 12 is a flowchart illustrating an image encoding method using two or more bit depths according to an embodiment of the present invention.

Referring to FIG. 12, an image encoding method using two or more bit depths may include: obtaining an input image to be encoded at step S300; performing first encoding on the obtained input image on the basis of an internal bit depth at step S310; transforming the input image on which the first encoding is performed into an external bit depth at step S320; and generating a bitstream by performing second encoding on the input image transformed into the external bit depth at step S330.

Herein, the internal bit depth may have a greater value than a value of the external bit depth.

Figure 13:
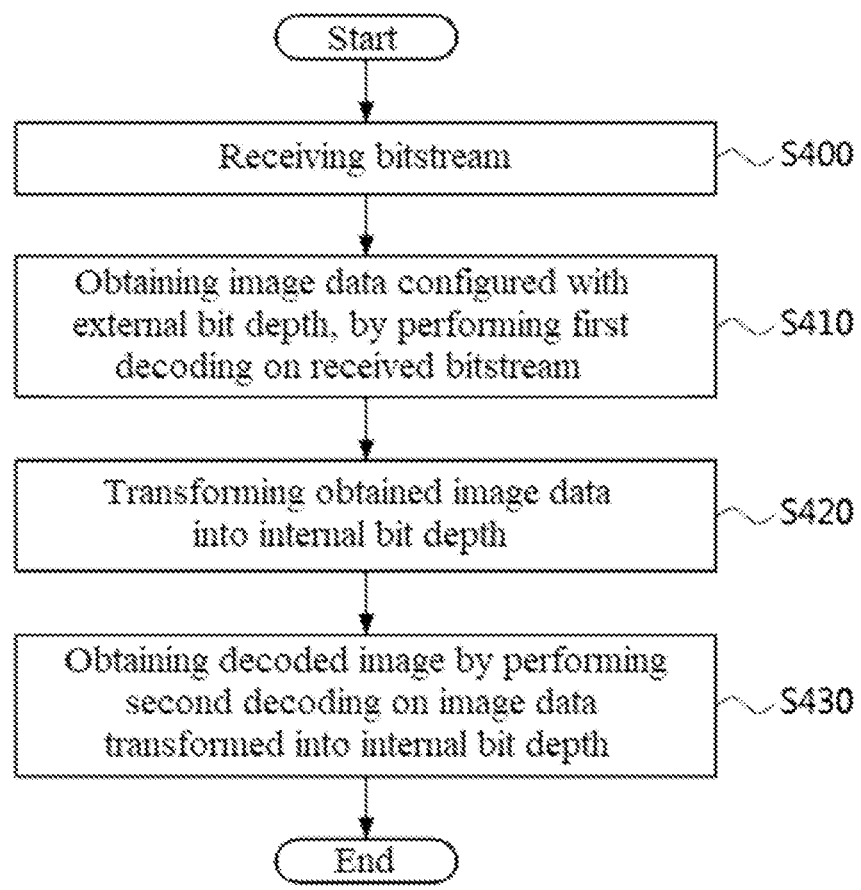
FIG. 13 is a flowchart illustrating an image decoding method using two or more bit depths according to an embodiment of the present invention.

FIG. 13 is a flowchart illustrating an image decoding method using two or more bit depths according to an embodiment of the present invention.

Referring to FIG. 13, an image decoding method using two or more bit depths may include: receiving a bitstream at step S400; obtaining image data configured with an external bit depth, by performing first decoding on the received bitstream at step S410; transforming the obtained image data into an internal bit depth at step S420; and obtaining a decoded image by performing second decoding on the image data transformed into the internal bit depth at step S430.

The methods according to the present invention may be realized in a program command format that may be executed by using diverse computing means, so as to be recorded in a computer-readable medium. The computer-readable medium may independently include a program command, a data file, a data structure, and so on, or may include a combination of the same. The program commands to be recorded on the computer-readable recording medium may be specially designed and configured for embodiments of the present invention or may be well-known to and be usable by those skilled in the art of computer software.

Examples of the computer-readable recording medium may include hardware devices, such as ROMs, RAMS, flash memories, and so on, specially configured for storing and executing program commands. Examples of a program command may not only include machine language codes, which are created by a compiler, but may also include high-level language codes, which may be executed by a computer by using an interpreter, and so on. The above-mentioned hardware equipment may be configured to be operated as one or more software modules for executing the operations of the present invention, and vice versa.

In addition, a part or whole of the configurations or functions of the above-described method or apparatus may be implemented in a combined manner or separately.

Although the present invention has been described with reference to the exemplary embodiments, those skilled in the art will appreciate that various modifications and variations can be made in the present invention without departing from the spirit or scope of the invention described in the appended claims.

The invention claimed is:

1. An image encoding method using intra prediction, which is performed by an image encoding apparatus, the method comprising:
obtaining an image to be encoded;
partitioning a current coding block in the image into a plurality of sub-blocks in a vertical direction or a horizontal direction, each of the sub-blocks being a unit in which the intra prediction is performed;
generating, based on the intra prediction, a prediction block of the current coding block;
generating a residual block of the current coding block based on the prediction block; and
generating a bitstream by encoding the residual block,
wherein the bitstream includes partitioning information on the partitioning of the current coding block,
wherein the partitioning information includes a first flag indicating whether the partitioning is performed for the current coding block and a second flag indicating whether a direction of the partitioning is the vertical direction or the horizontal direction,
wherein a number of the sub-blocks resulting from the partitioning of the current coding block is determined to be only one of 2 or 4 according to a size of the current coding block,
wherein, in response to a product of a width and a height of the current coding block being less than 64, the number of the sub-blocks is determined to be 2, and
wherein, in response to the product of the width and height of the current coding block being greater than or equal to 64, the number of the sub-blocks is determined to be 4.

2. The encoding method of claim 1,
wherein, in response to the current coding block being partitioned into two sub-blocks, a height of the sub-blocks is greater or less than a width of the sub-blocks.

3. An image decoding method using intra prediction, which is performed by an image decoding apparatus, the method comprising:
receiving a bitstream including an image to be decoded;
partitioning a current coding block in image into a plurality of sub-blocks in a vertical direction or a horizontal direction, each of the sub-blocks being a unit in which the intra prediction is performed;
generating, based on the intra prediction, a prediction block of the current coding block; and
restoring the current coding block by adding a residual block of the current coding block obtained from the bitstream to the prediction block,
wherein the bitstream includes partitioning information on the partitioning of the current coding block,
wherein the partitioning information includes a first flag indicating whether the partitioning is performed for the current coding block and a second flag indicating whether a direction of the partitioning is the vertical direction or the horizontal direction,
wherein a number of the sub-blocks resulting from the partitioning of the current coding block is determined to be only one of 2 or 4 according to a size of the current coding block 4,
wherein, in response to a product of a width and a height of the current coding block being less than 64, the number of the sub-blocks is determined to be 2, and
wherein, in response to the product of the width and height of the current coding block being greater than or equal to 64, the number of the sub-blocks is determined to be 4.

4. The decoding method of claim 3,
wherein, in response to the current coding block being partitioned into two sub-blocks, a height of the sub-blocks is greater or less than a width of the sub-blocks.

5. A non-transitory computer-readable medium for storing data associated with an image, comprising:

a data stream including an encoded residual block of a current coding block in the image, wherein the current coding block is partitioned into a plurality of sub-blocks in a vertical direction or a horizontal direction, each of the sub-blocks being a unit in which an intra prediction is performed, wherein a prediction block of the current coding block is generated based on the intra prediction, wherein the current coding block is restored by adding a residual block obtained from the data stream to the prediction block, wherein the data stream includes partitioning information on the partitioning of the current coding block, wherein the partitioning information includes a first flag indicating whether the partitioning is performed for the current coding block and a second flag indicating whether a direction of the partitioning is the vertical direction or the horizontal direction, wherein a number of the sub-blocks resulting from the partitioning of the current coding block is determined to be only one of 2 or 4 according to a size of the current coding block, wherein, in response to a product of a width and a height of the current coding block being less than 64, the number of the sub-blocks is determined to be 2, and wherein, in response to the product of the width and height of the current coding block being greater than or equal to 64, the number of the sub-blocks is determined to be 4.

6. The non-transitory computer readable medium of claim 5, wherein, in response to the current coding block being partitioned into two sub-blocks, a height of the sub-blocks is greater or less than a width of the sub-blocks.

* * * * *